(12) United States Patent
Lee et al.

(10) Patent No.: US 12,563,319 B2
(45) Date of Patent: Feb. 24, 2026

(54) IMAGE SENSOR INCLUDING ANALOG-TO-DIGITAL CONVERTER CONNECTED TO MULTIPLEXER AND DEMULTIPLEXER, AND OPERATION METHOD THEREOF

(71) Applicant: Samsung Electronics Co., Ltd., Suwon-si (KR)

(72) Inventors: Hyeokjong Lee, Suwon-si (KR); Takahiko Inada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/800,557

(22) Filed: Aug. 12, 2024

(65) Prior Publication Data

US 2025/0267378 A1 Aug. 21, 2025

(30) Foreign Application Priority Data

Feb. 16, 2024 (KR) ........................ 10-2024-0022886

(51) Int. Cl.
| | |
|---|---|
| *H04N 25/772* | (2023.01) |
| *H04N 25/766* | (2023.01) |
| *H04N 25/767* | (2023.01) |

(52) U.S. Cl.
CPC ......... *H04N 25/772* (2023.01); *H04N 25/766* (2023.01); *H04N 25/767* (2023.01)

(58) Field of Classification Search
CPC ........ H04N 23/52; H04N 23/54; H04N 23/57; H04N 23/60; H04N 25/40; H04N 25/42; H04N 25/44–46; H04N 25/70; H04N 25/76–78; H03M 1/00
See application file for complete search history.

(56) References Cited

U.S. PATENT DOCUMENTS

| | | | |
|---|---|---|---|
| 7,764,396 B2 | 7/2010 | Yu | |
| 7,876,362 B2 | 1/2011 | Krymski | |
| 8,432,761 B2 | 4/2013 | Kim et al. | |
| 8,830,334 B2 | 9/2014 | Silsby | |
| 9,537,501 B2 * | 1/2017 | Lee ..................... | H03M 1/1295 |
| 9,706,156 B2 | 7/2017 | Lee et al. | |
| 10,841,525 B1 | 11/2020 | Tsai et al. | |
| 10,863,131 B2 | 12/2020 | Jeong et al. | |
| 11,032,501 B2 * | 6/2021 | Stepanovic ........... | H03M 1/466 |

(Continued)

*Primary Examiner* — Twyler L Haskins
*Assistant Examiner* — Akshay Trehan
(74) *Attorney, Agent, or Firm* — Fish & Richardson P.C.

(57) ABSTRACT

An image sensor including "n" analog-to-digital converters (ADCs); a selection circuit that generates a selection signal indicating a target ADC and having k-bit size; an input demultiplexer that generates first to n-th enable signals each having 1-bit size, respectively; and an output multiplexer. The target ADC distributes digital bits of a target digital signal to some of the ADCs in response to a target enable signal corresponding to the target ADC. The "n" ADCs respectively output first to n-th multiplexing bits each corresponding to one of the distributed digital bits of the target digital signal or a dummy bit to the output multiplexer. The output multiplexer outputs the target digital signal based on a logical operation of the first to n-th multiplexing bits, k is an arbitrary natural number, and n is a natural number more than k and less than or equal to $2^k$.

20 Claims, 14 Drawing Sheets

(56) References Cited

U.S. PATENT DOCUMENTS

| | | | |
|---|---|---|---|
| 11,206,368 B2 | 12/2021 | Chang et al. | |
| 11,356,621 B2 | 6/2022 | Rotte et al. | |
| 11,683,612 B2 | 6/2023 | Sakakibara | |
| 2021/0195130 A1* | 6/2021 | Niwa | H04N 25/47 |

* cited by examiner

Figure 2:
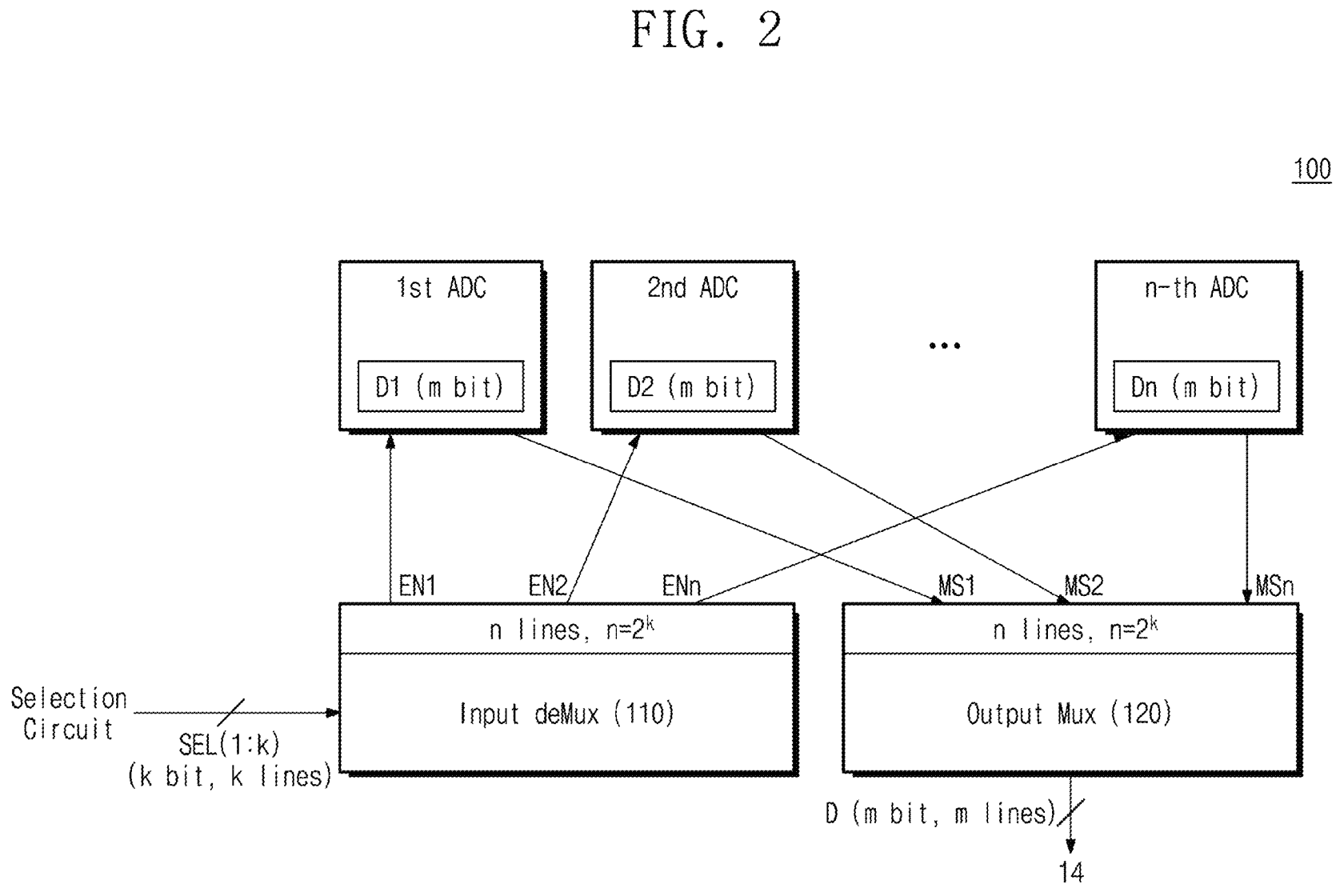

1st ADC
D1 (m bit)

2nd ADC
D2 (m bit)

n-th ADC
Dn (m bit)

...

Input deMux (110)
n lines, n=2^k

EN1 EN2 ENn

Output Mux (120)
n lines, n=2^k

MS1 MS2 MSn

Selection Circuit
SEL(1:k)
(k bit, k lines)

D (m bit, m lines)

| SEL(1:2) (2 bit) | EN1 | EN2 | EN3 | EN4 |
|---|---|---|---|---|
| 00 | 1 | 0 | 0 | 0 |
| 01 | 0 | 1 | 0 | 0 |
| 10 | 0 | 0 | 1 | 0 |
| 11 | 0 | 0 | 0 | 1 |

IMAGE SENSOR INCLUDING ANALOG-TO-DIGITAL CONVERTER CONNECTED TO MULTIPLEXER AND DEMULTIPLEXER, AND OPERATION METHOD THEREOF

CROSS-REFERENCE TO RELATED APPLICATIONS

This application claims priority under 35 U.S.C. § 119 to Korean Patent Application No. 10-2024-0022886 filed on Feb. 16, 2024, in the Korean Intellectual Property Office, the disclosure of which is incorporated by reference herein in its entirety.

BACKGROUND

Embodiments of the present disclosure described herein relate to image sensor, and more particularly, relates to image sensors including analog-to-digital converters (ADCs) connected to a demultiplexer and a multiplexer and an operation method thereof.

An image sensor may generate an image by receiving light through a photodiode of a pixel circuit. An analog-to-digital converter (ADC) circuit may convert an analog voltage corresponding to the light into a digital signal and may store the digital signal. The ADC circuit may be activated by an input signal, may store a digital signal, and may output the digital signal as an output signal.

As the number of pixel circuits increase to satisfy the demand of high-definition image sensors, the number of ADCs is increasing. However, the increase in the number of lines transferring input signals to the ADCs and the increase in the number of lines transferring output signals of the ADCs cause the increase of congestion of signals which the lines transfer.

SUMMARY

Some example embodiments of the present disclosure provide an image sensor including analog-to-digital converters connected to a demultiplexer and a multiplexer, and an operation method thereof.

Some example embodiments of the present disclosure provide an image sensor that includes first to n-th analog-to-digital converters (ADCs); a selection circuit that generates a selection signal indicating a target ADC from among the first to n-th ADCs, the selection signal having k-bit size; an input demultiplexer that generates first to n-th enable signals each having 1-bit size based on the selection signal and outputs the first to n-th enable signals to the first to n-th ADCs, respectively; and an output multiplexer that is connected to the first to n-th ADCs. The target ADC distributes digital bits of a target digital signal to some of the first to n-th ADCs in response to a target enable signal corresponding to the target ADC from among the first to n-th enable signals. The first to n-th ADCs respectively output first to n-th multiplexing bits each corresponding to one of the distributed digital bits of the target digital signal or a dummy bit to the output multiplexer. The output multiplexer outputs the target digital signal based on a logical operation of the first to n-th multiplexing bits. k is an arbitrary natural number, and n is a natural number more than k and less than or equal to $2^k$.

Some example embodiments of the present disclosure further provide an image sensor that includes first to 2n-th analog-to-digital converters (ADCs); a first selection circuit that generates a first selection signal indicating a first target ADC from among the first to n-th ADCs, the first selection signal having k-bit size; a second selection circuit that generates a second selection signal indicating a second target ADC from among the (n+1)-th to 2n-th ADCs, the second selection signal having the k-bit size; a first input demultiplexer that generates first to n-th enable signals each having 1-bit size based on the first selection signal and outputs the first to n-th enable signals to the first to n-th ADCs, respectively; a second input demultiplexer that generates (n+1)-th to 2n-th enable signals each having the 1-bit size based on the second selection signal and outputs the (n+1)-th to 2n-th enable signals to the (n+1)-th to 2n-th ADCs, respectively; a first output multiplexer that is connected to the first to n-th ADCs; and a second output multiplexer that is connected to the (n+1)-th to 2n-th ADCs. The first output multiplexer outputs a first target digital signal of a first target ADC from among the first to n-th ADCs based on a logical operation of first to n-th multiplexing bits which are received from the first to n-th ADCs and which respectively correspond to digital bits of the first target digital signal of the first target ADC and dummy bits. The second output multiplexer outputs a second target digital signal of a second target ADC from among the (n+1)-th to 2n-th ADCs based on a logical operation of (n+1)-th to 2n-th multiplexing bits which are received from the (n+1)-th to 2n-th ADCs and which respectively correspond to digital bits of the second target digital signal of the second target ADC and the dummy bits. k is an arbitrary natural number, and n is a natural number more than k and less than or equal to $2^k$.

Some example embodiments of the present disclosure still further provide an operation method of an image sensor that includes a selection circuit, first to n-th ADCs, an input demultiplexer, and an output multiplexer. The operation method includes generating, by the selection circuit, a selection signal indicating a target ADC from among the first to n-th ADCs, the selection signal having k-bit size; generating, by the input demultiplexer, first to n-th enable signals each having 1-bit size, based on the selection signal; outputting, by the input demultiplexer, the first to n-th enable signals to the first to n-th ADCs, respectively; distributing, by the target ADC, digital bits of a target digital signal to some of the first to n-th ADCs in response to a corresponding target enable signal from among the first to n-th enable signals; outputting, by the first to n-th ADCs, first to n-th multiplexing bits each corresponding to one of the digital bits or a dummy bit to the output multiplexer, respectively; and outputting, by the output multiplexer, the target digital signal based on a logical operation of the first to n-th multiplexing bits. k is an arbitrary natural number, and n is a natural number more than k and less than or equal to $2^k$.

BRIEF DESCRIPTION OF THE FIGURES

The above and other objects and features of the present disclosure will become apparent by describing in detail embodiments thereof with reference to the accompanying drawings.

FIG. 1 is a block diagram of an image sensor according to some example embodiments of the present disclosure.

FIG. 2 is a block diagram of a data bus circuit of FIG. 1, according to some example embodiments of the present disclosure.

3

Figure 3:
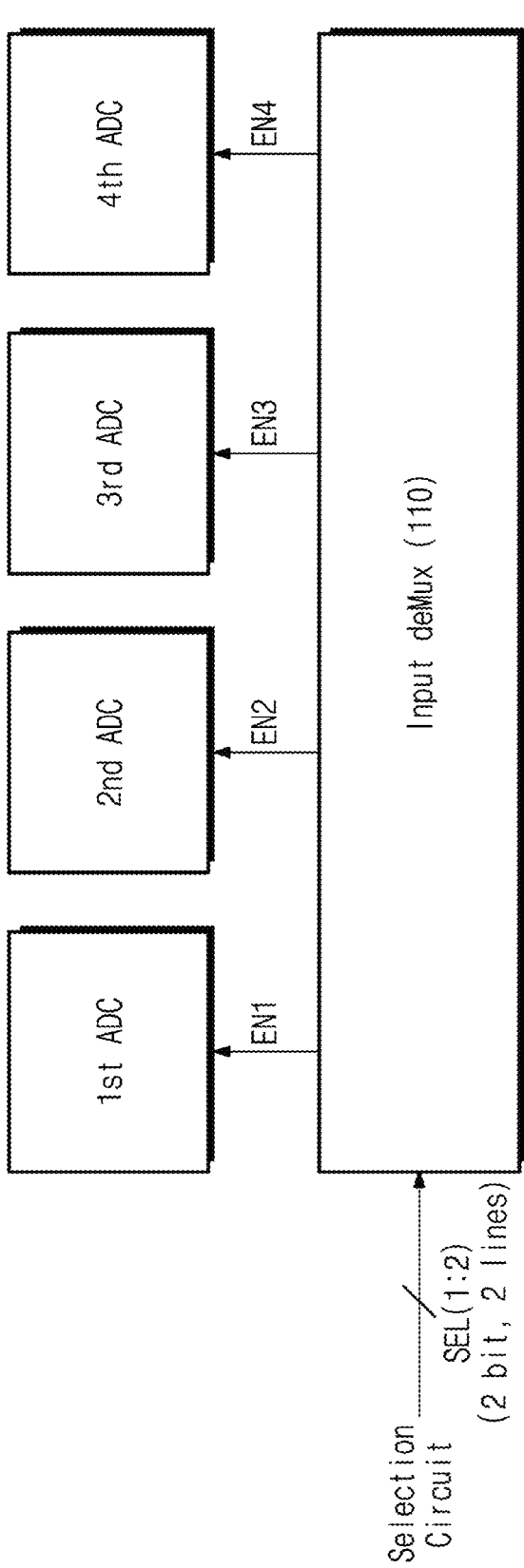

FIG. 3 is a diagram describing analog-to-digital converters (ADCs) and an input demultiplexer when "n" is 4, according to some example embodiments of the present disclosure.

FIG. 4 is a diagram describing a selection signal and enable signals of FIG. 3, according to some example embodiments of the present disclosure.

Figure 5:
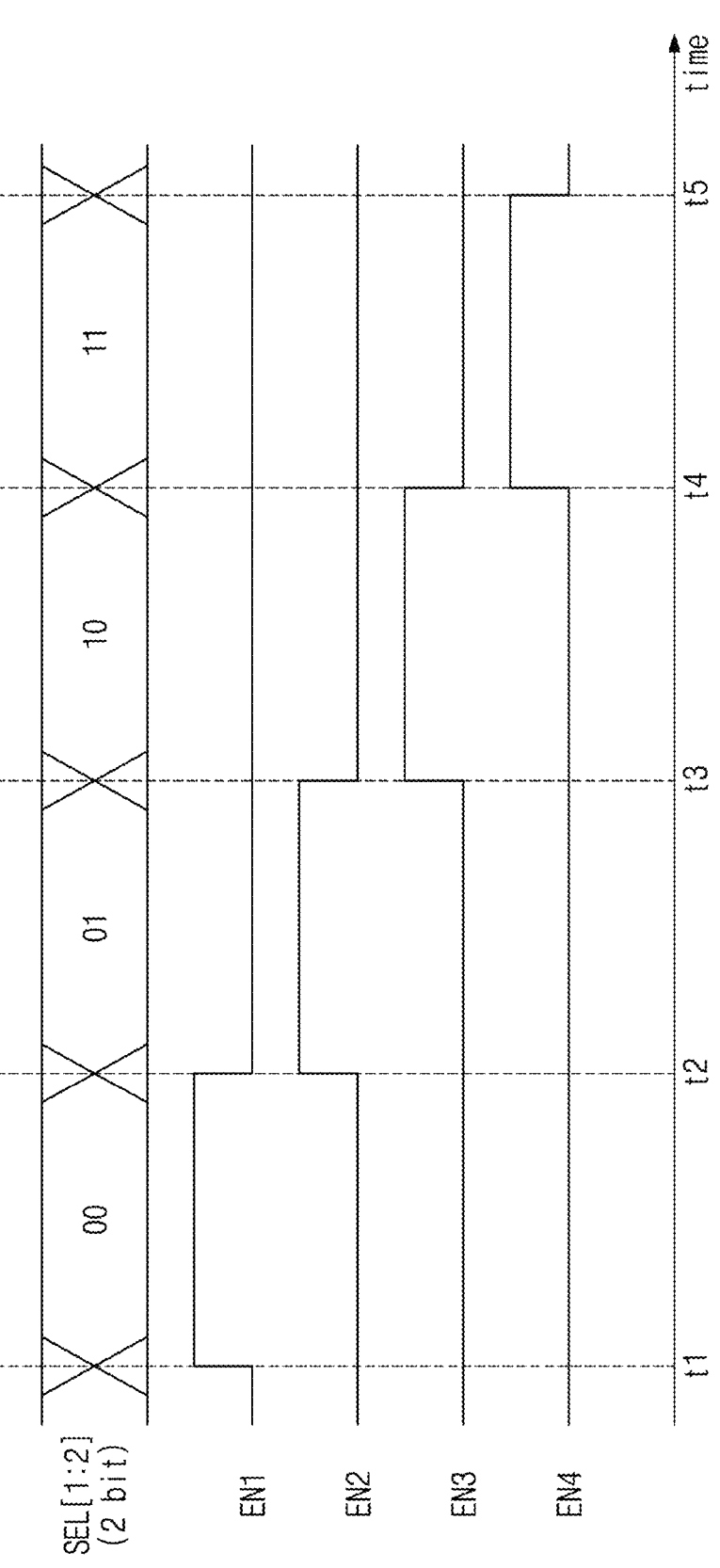

FIG. 5 is a diagram describing a selection signal and enable signals of FIG. 3, according to some example embodiments of the present disclosure.

Figure 6:
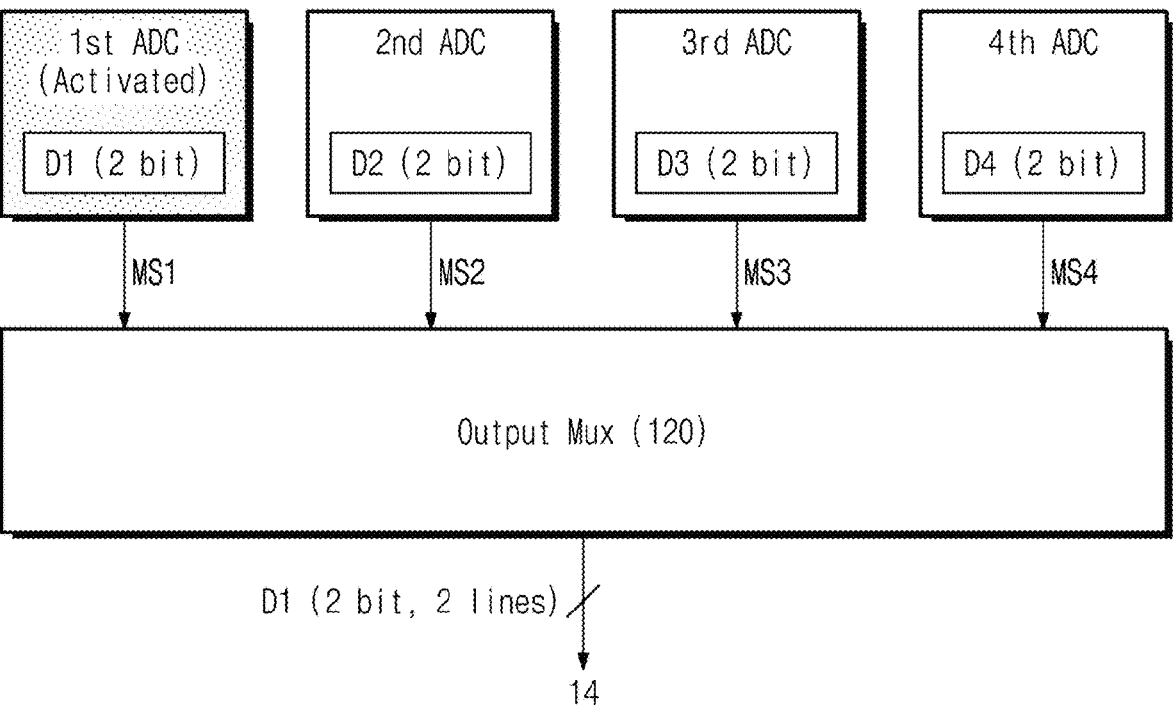

FIG. 6 is a diagram describing ADCs and an output multiplexer when "n" is 4, according to some example embodiments of the present disclosure.

Figure 7:
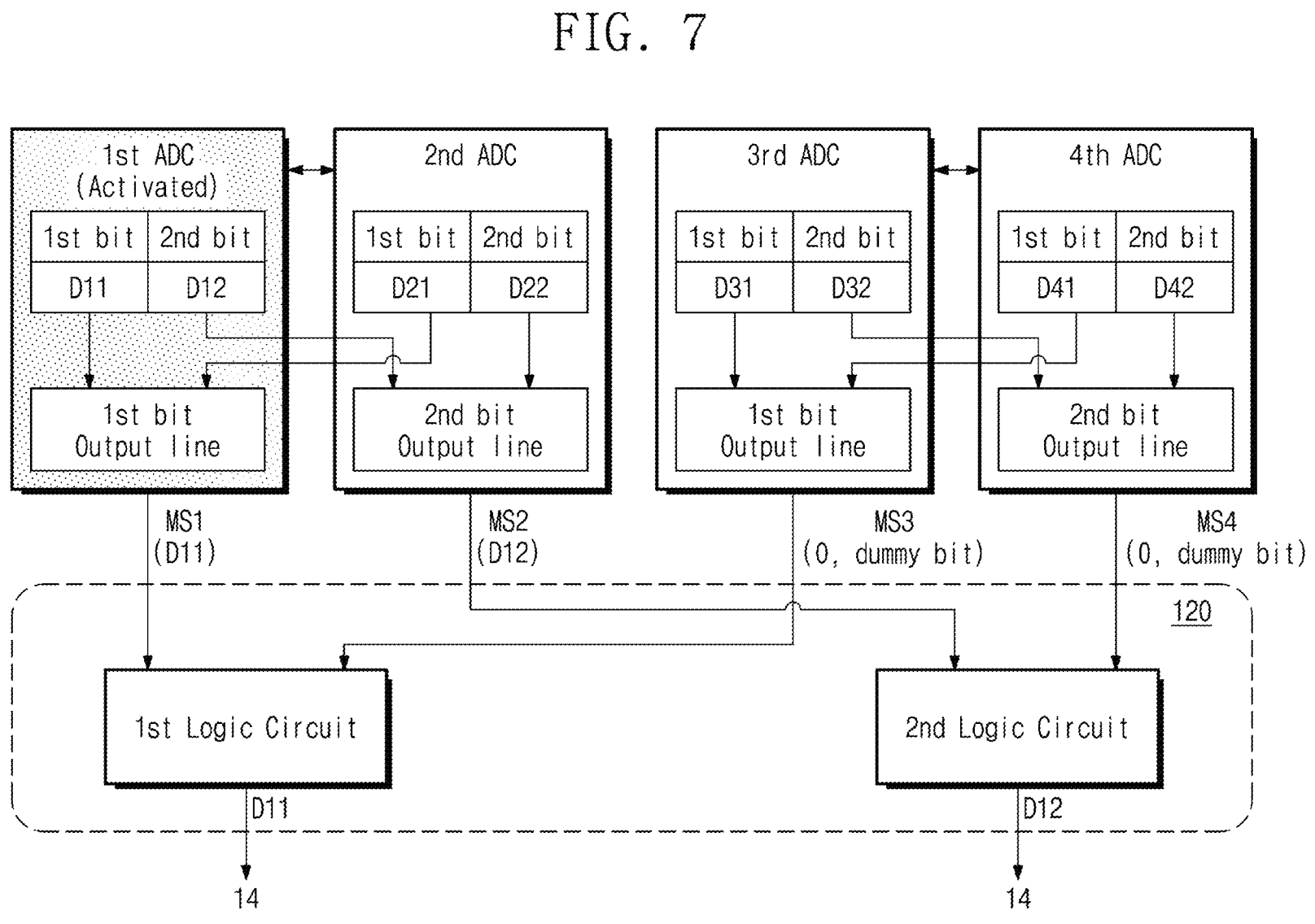

FIG. 7 is a diagram describing ADCs and an output multiplexer when "n" is 4 and "m" is 2 in detail, according to some example embodiments of the present disclosure.

Figure 8:
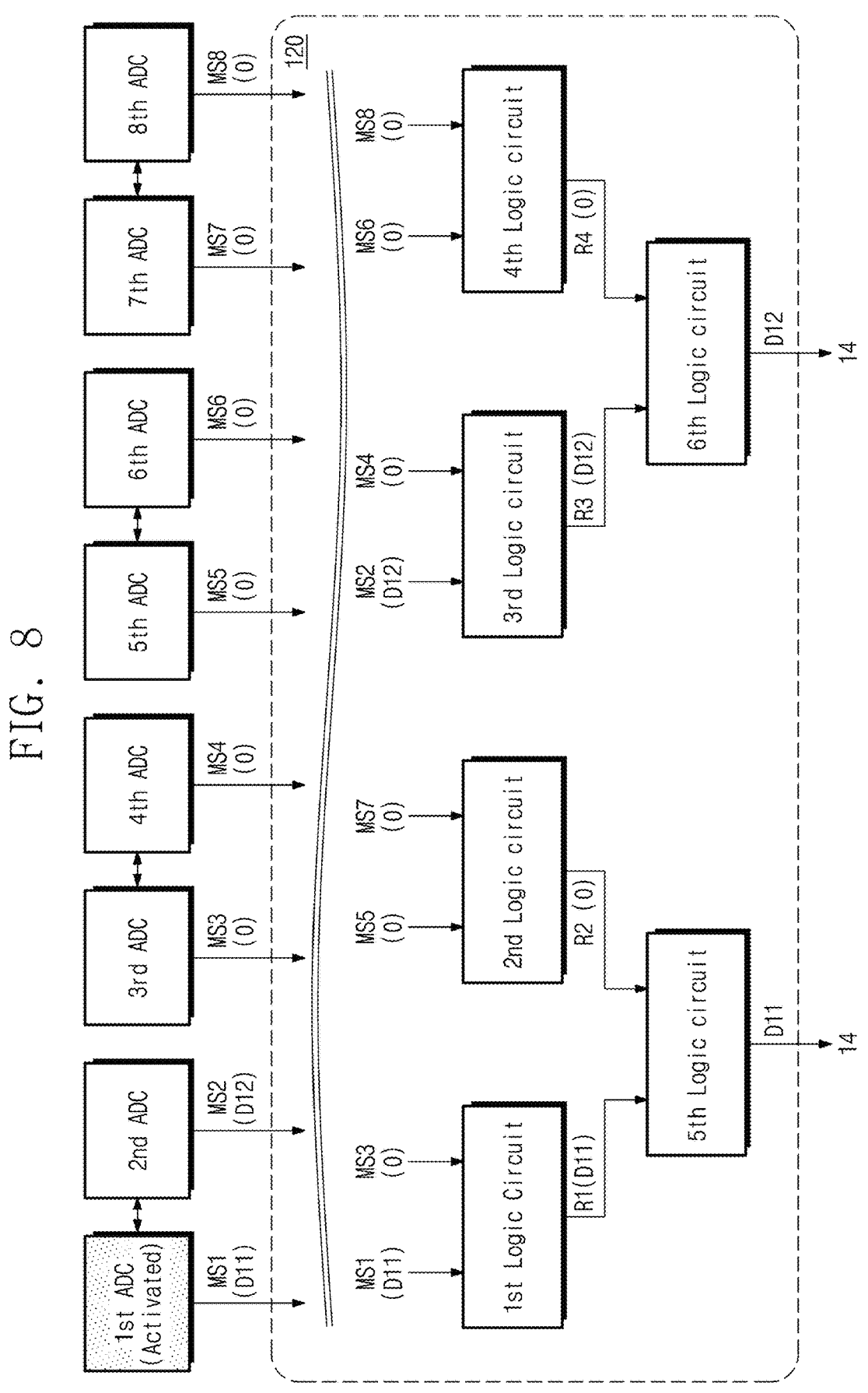

FIG. 8 is a diagram describing ADCs and an output multiplexer when "n" is 8 and "m" is 2 in detail, according to some example embodiments of the present disclosure.

Figure 9:
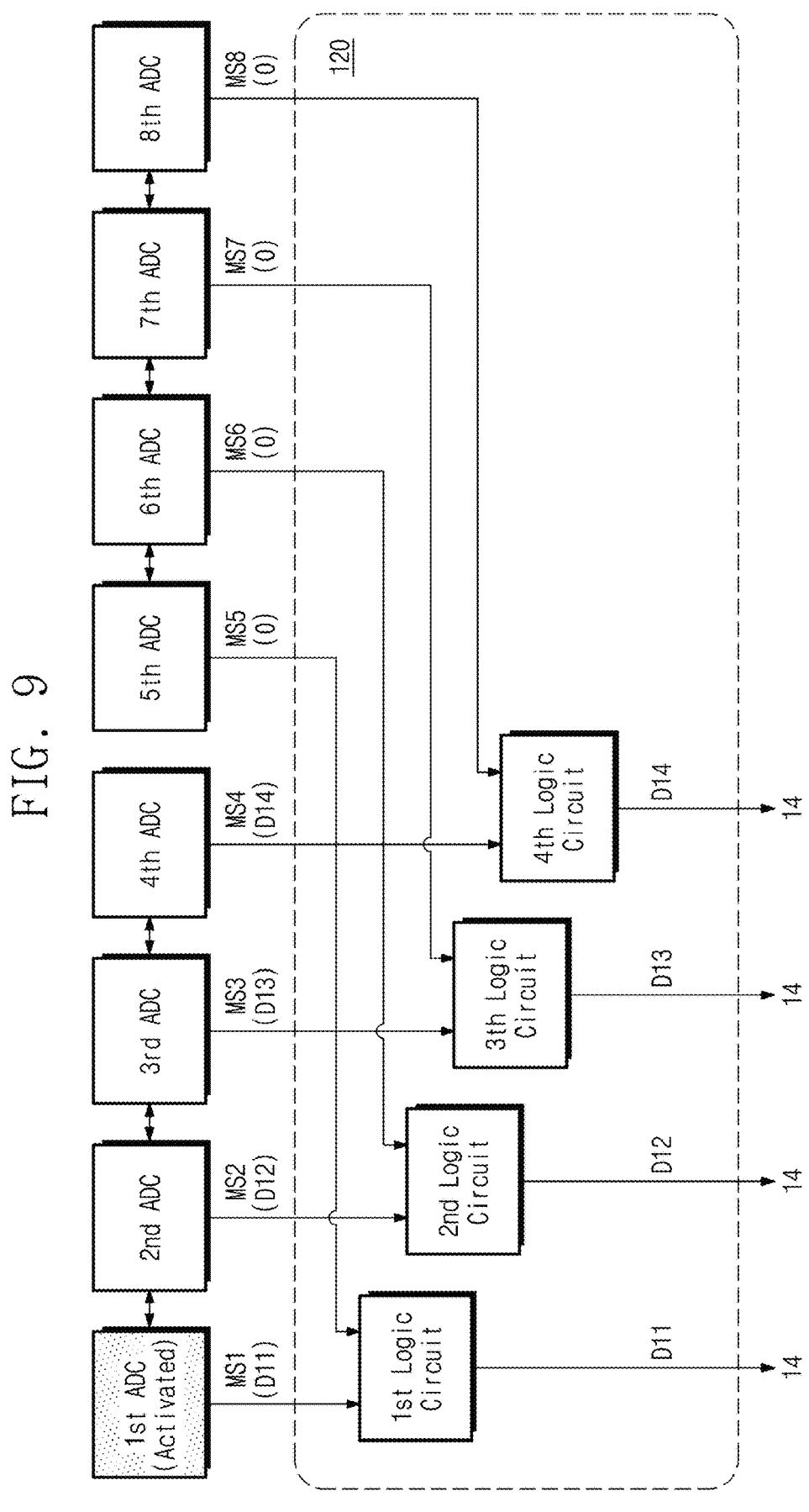

FIG. 9 is a diagram describing ADCs and an output multiplexer when "n" is 8 and "m" is 4 in detail, according to some example embodiments of the present disclosure.

Figure 10:
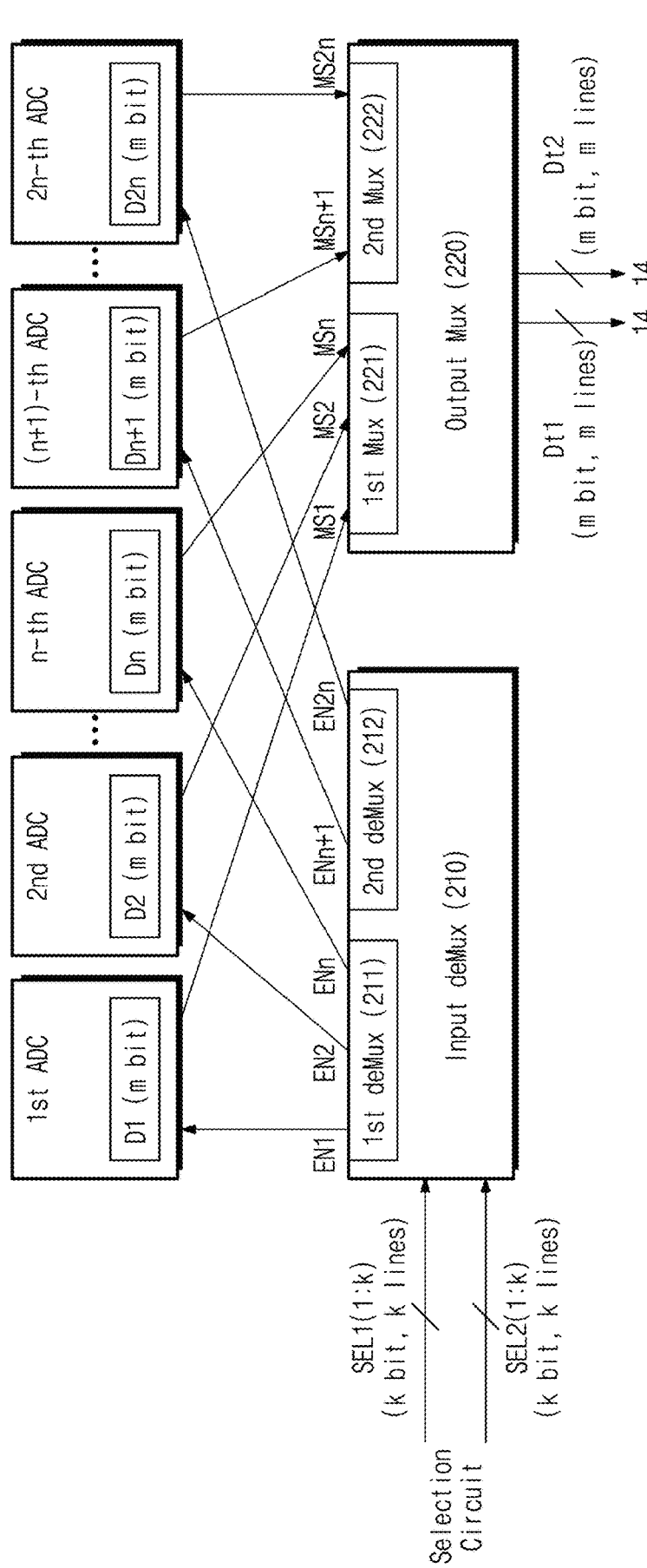

FIG. 10 is a block diagram of a data bus circuit including a plurality of demultiplexers and a plurality of multiplexers according to some example embodiments of the present disclosure.

Figure 11:
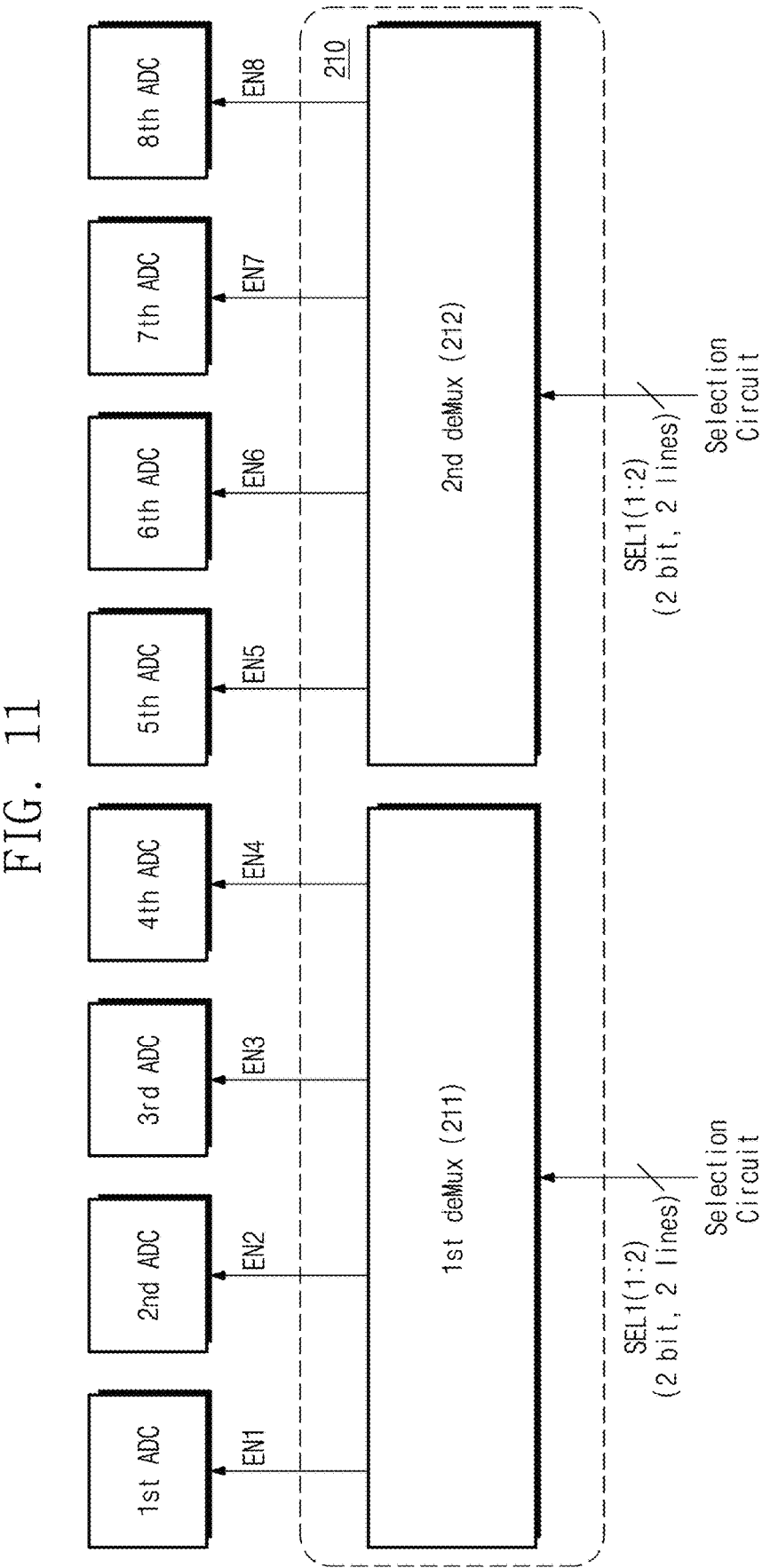

FIG. 11 is a diagram describing ADCs and a plurality of input demultiplexers of FIG. 10 when "n" is 4, according to some example embodiments of the present disclosure.

Figure 12:
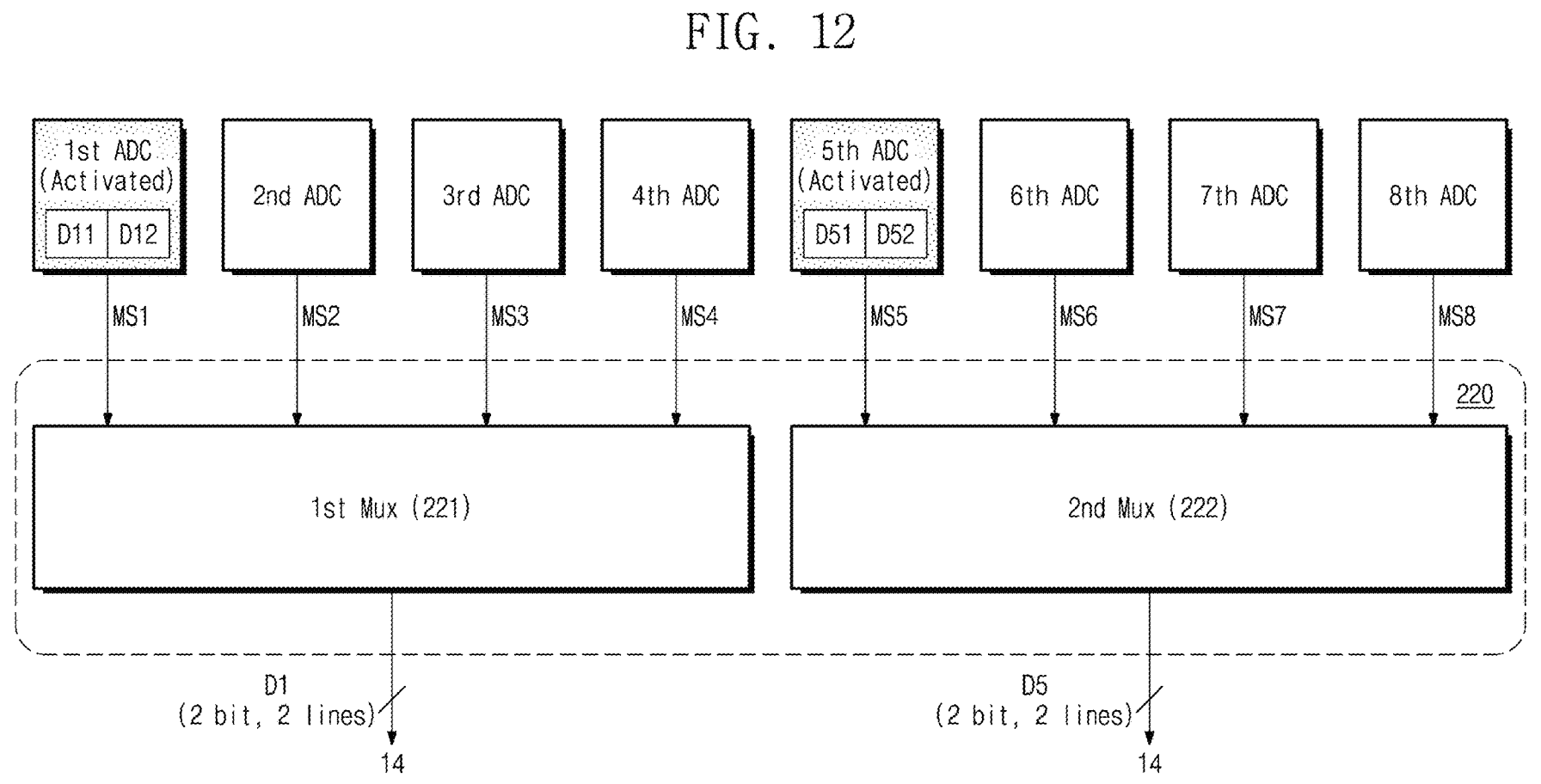

FIG. 12 is a diagram describing ADCs and a plurality of output multiplexers of FIG. 10 when "n" is 4, according to some example embodiments of the present disclosure.

Figure 13:
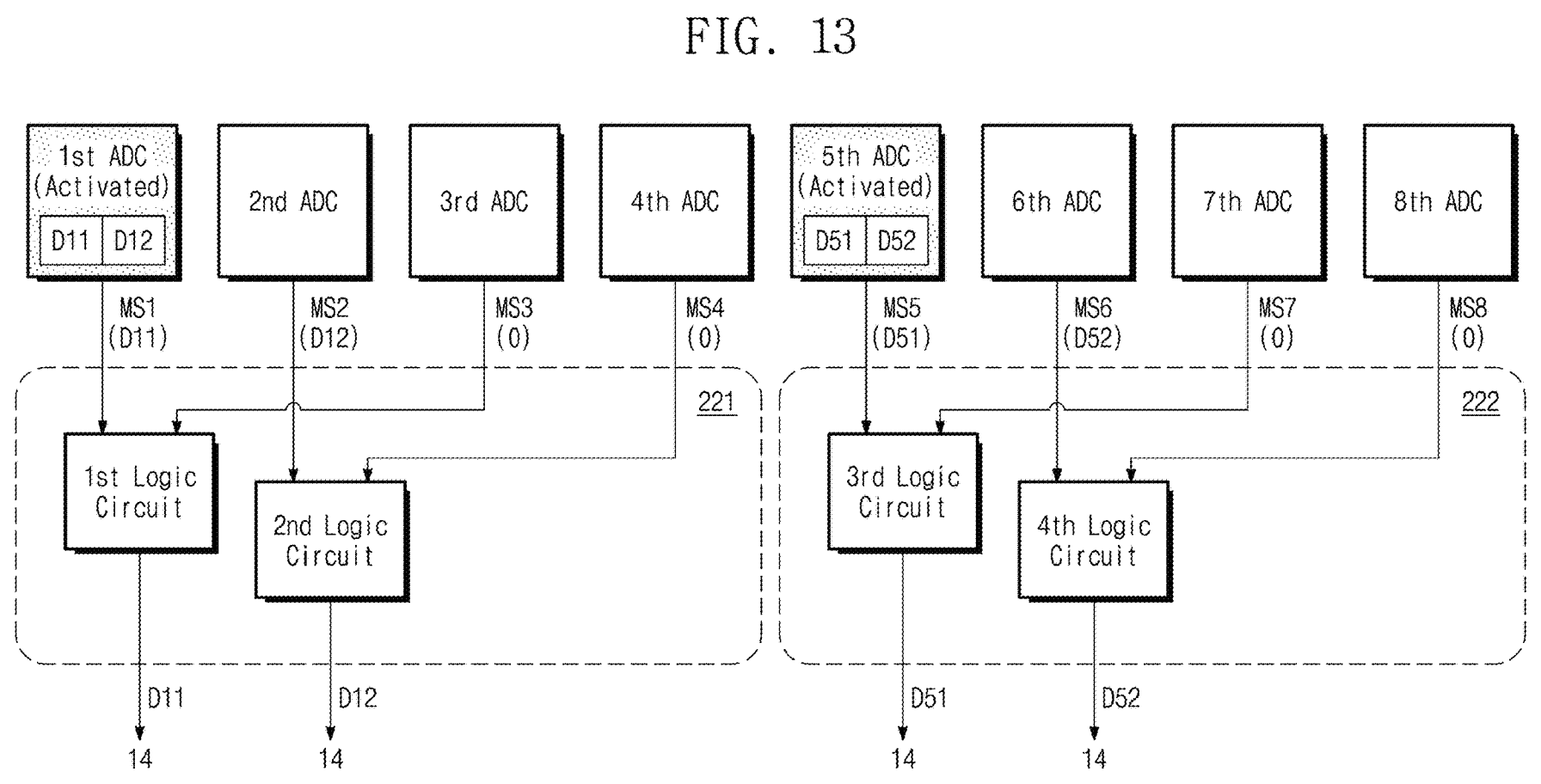

FIG. 13 is a diagram describing ADCs and a plurality of output multiplexers of FIG. 10 when "n" is 4 and "m" is 2 in detail, according to some example embodiments of the present disclosure.

Figure 14:
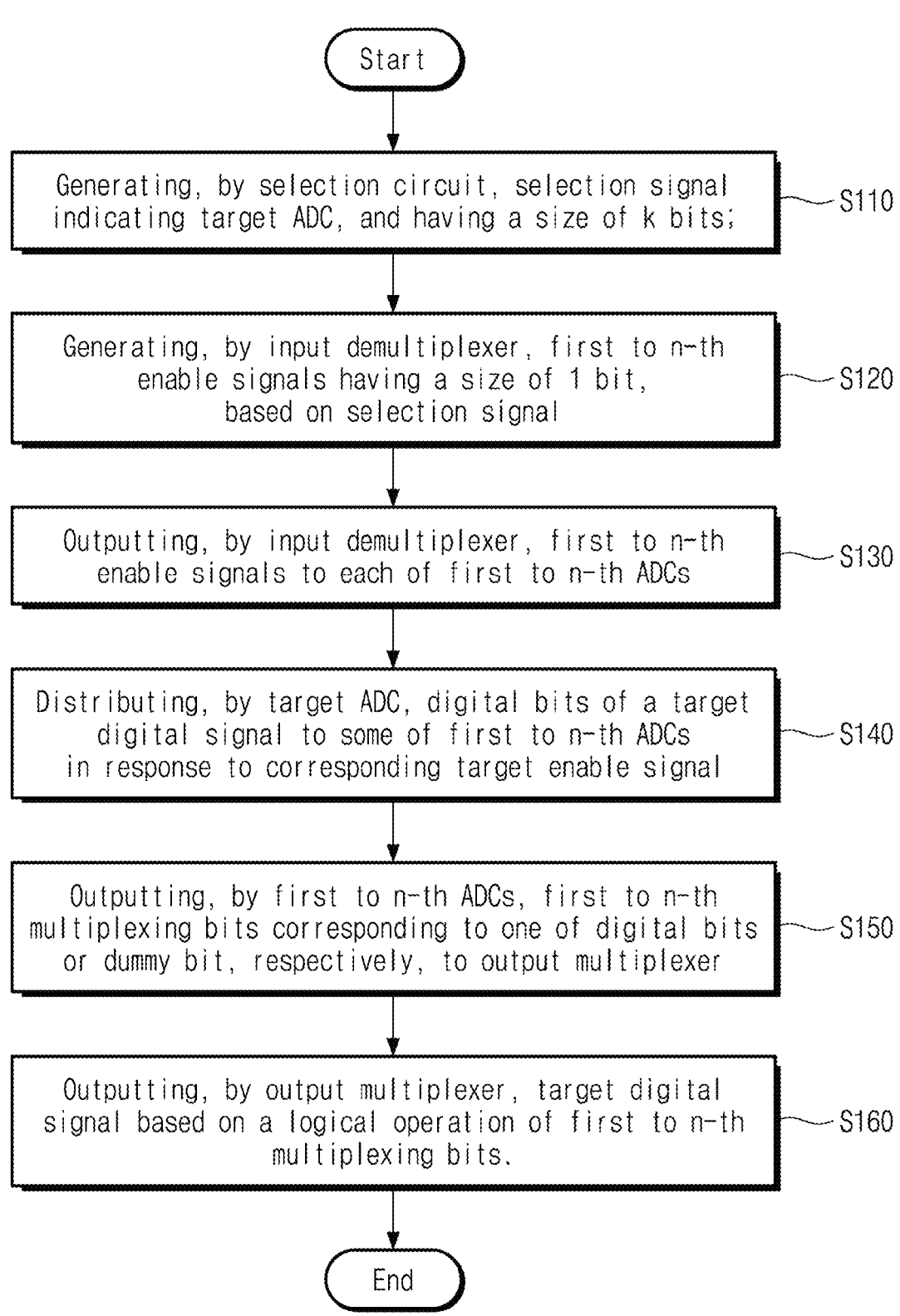

FIG. 14 is a flowchart describing an operation method of an image sensor according to some example embodiments of the present disclosure.

DETAILED DESCRIPTION

Below, embodiments of the present disclosure will be described in detail and clearly to such an extent that one skilled in the art may carry out embodiments of the present disclosure.

Figure 1:
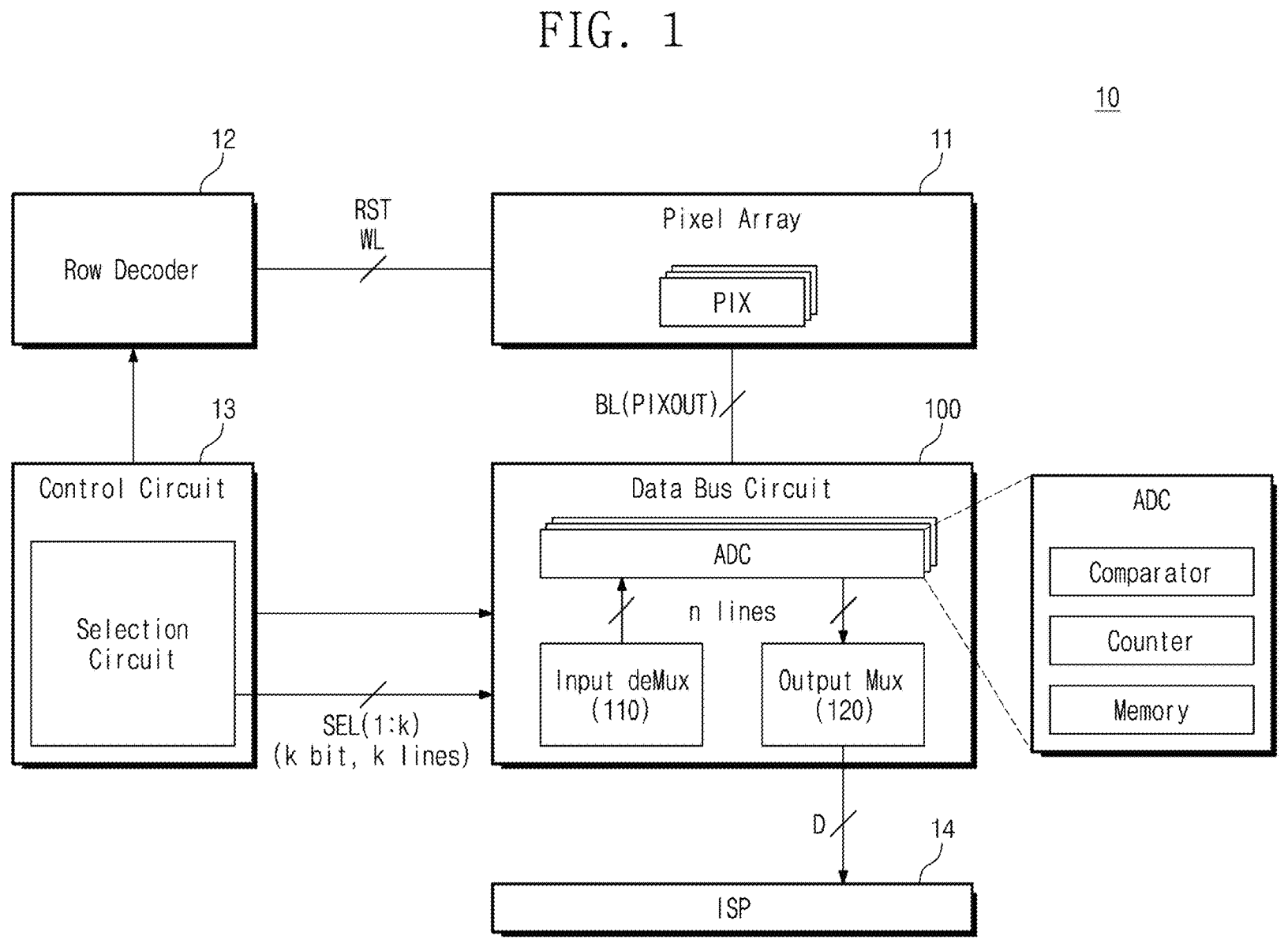

FIG. 1 is a block diagram of an image sensor according to some example embodiments of the present disclosure. Referring to FIG. 1, an image sensor 10 to which a data bus circuit 100 according to some example embodiments of the present disclosure is applied is illustrated. Below, to describe the technical idea of the present disclosure, embodiments of the present disclosure will be described based on the data bus circuit 100 included in the image sensor 10. However, the present disclosure is not limited thereto. For example, the data bus circuit 100 according to the present disclosure may be applied to various sensors, various signal processing devices, etc. to output digital signals converted from an analog signal to any other component(s) by using a small number of lines.

Referring to FIG. 1, the image sensor 10 may include a pixel array 11, a row decoder 12, a control circuit 13, an image signal processor (ISP) 14, and the data bus circuit 100.

The pixel array 11 may include a plurality of pixel circuits PIX. The pixel circuit PIX may be an image pixel circuit with a one-transistor structure, a three-transistor structure, a four-transistor structure, a two-photodiode structure, etc. However, the present disclosure is not limited thereto, and the pixel circuit PIX may be implemented in various structures.

Although not illustrated, the pixel array 11 may be in the shape of a matrix including a plurality of pixel rows and a plurality of pixel columns. For example, the plurality of pixel circuits PIX may be arranged in a row direction and a column direction. Pixel circuits PIX located at the same column may be connected to the same bit line BL. Pixel circuits PIX located at the same row may be connected to the same reset line RST or the same word line WL. Each of the plurality of pixel circuits PIX of the pixel array 11 may output a pixel signal PIXOUT depending on the intensity or the amount of light incident from the outside. In some example embodiments, the pixel signal PIXOUT may be an analog signal corresponding to the intensity or the amount of light incident from the outside.

The row decoder 12 may be connected to the pixel array 11 through the reset lines RST and the word lines WL. The row decoder 12 may control the reset lines RST and the word lines WL under control of the control circuit 13. The control circuit 13 may control the row decoder 12 and the data bus circuit 100 such that an image of the outside is captured through the pixel array 11. In some example embodiments, lines which connect the row decoder 12 and the pixel array 11 may be variously changed and modified depending on a structure of the pixel circuits PIX included in the pixel array 11.

The control circuit 13 may include a selection circuit. The selection circuit may generate a selection signal SEL and may provide the selection signal SEL to the data bus circuit 100. The selection signal SEL may indicate a target analog-to-digital converter (ADC) among a plurality of ADCs of the data bus circuit 100 and may have a size of "k" bits. For example, the selection signal SEL may include first to k-th selection bits. In some example embodiments, "k" may be an arbitrary natural number.

In detail, the selection circuit may generate $2^k$ different selection signals respectively corresponding to a maximum of $2^k$ ADCs based on the first to k-th selection bits. For example, when "k" is 2, combinations of the first and second selection bits which the selection signal SEL is capable of having may be "00", "01", "10", and "11", that is, the number of combinations of the first and second selection bits may be 4 ($=2^2$). That is, the selection circuit may generate selection signals respectively corresponding to a maximum of four ADCs.

However, when the number of ADCs of the data bus circuit 100 is less than "$2^k$", for example, when the number of ADCs is "n" less than "$2^k$", the selection circuit may generate only "n" different selection signals respectively corresponding to "n" ADCs from among possible "$2^k$" different selection signals.

For example, when "k" is 2 and "n" is 3, the selection circuit may generate only selection signals with three different combinations among the possible 4 ($=2^2$) combinations of the first and second selection bits.

Below, for convenience of description, some example embodiments of effectively reducing the number of input lines, that is where the number of ADCs is "$2^k$", will be described in detail. Also, some example embodiments where the number of ADCs is "$2^k$" are illustrated in drawings.

The image signal processor 14 may transfer a signal (e.g., a clock signal) corresponding to an operation, in which the ADCs output digital signals stored therein, to the selection circuit. The selection circuit may generate the selection signal SEL indicating a target ADC based on the signal received from the image signal processor 14. However, the present disclosure is not limited thereto. For example, the selection circuit may receive the above signal from an internal or external component of the image sensor 10, not the image signal processor 14.

In some example embodiments, the selection circuit may provide the k-bit selection signal to the data bus circuit 100 through "k" input lines. The input lines may indicate transmission lines through which the selection signal is transferred.

The data bus circuit 100 may include a plurality of ADCs, an input demultiplexer 110, and an output multiplexer 120.

The plurality of ADCs are connected to the pixel array 11 through the bit lines BL. For example, the plurality of ADCs may be respectively connected to pixel circuit columns of the pixel circuits PIX. The number of ADCs may be equal to the number of pixel circuit columns. For example, the number of ADCs may be "n". In some example embodiments, "n" may be a natural number which is more than "k" and less than or equal to "$2^k$" (e.g., k being the size of the selection signal SEL).

The plurality of ADCs may receive the pixel signals PIXOUT from the plurality of pixel circuits PIX of the pixel array 11 through the bit lines BL and may convert and store the received pixel signals PIXOUT into digital signal "D".

For example, each of the plurality of ADCs may include a comparator, a counter, and a memory.

The comparator may receive the pixel signal PIXOUT from the pixel array 11 through the bit line BL. The comparator may generate a comparison signal based on comparison of a ramp signal and a pixel signal. The ramp signal may be a voltage signal which increases or decreases periodically and linearly. For example, the comparison signal may be low when the magnitude of the ramp signal is greater than the magnitude of the pixel signal PIXOUT and may be high when the magnitude of the ramp signal is smaller than or equal to the magnitude of the pixel signal PIXOUT.

The counter may generate a digital signal "D" corresponding to the pixel signal PIXOUT based on the comparison signal and reference clock signals. For example, the reference clock signals may be clock signals which are based on a system clock signal received from a phase locked loop (PLL) of an image sensor and in which a digital value expressed periodically varies periodically.

For example, the counter may generate a digital value, which the reference clock signals corresponding to a low-to-high transition point of the comparison signal indicates, as the digital signal "D". The counter may store the digital signal "D" in the memory. An example in which each of the plurality of ADCs includes the memory independent of the comparator and the counter is illustrated in FIG. 1, but the memory may be included in the counter.

The input demultiplexer 110 may receive the selection signal SEL from the selection circuit. The input demultiplexer 110 may generate enable signals corresponding to the plurality of ADCs, based on the selection signal SEL. For example, the input demultiplexer 110 may provide "n" enable signals to "n" ADCs, respectively. By the enable signals, a target ADC among the plurality of ADCs may be activated, and the remaining ADCs may not be activated. The data bus circuit 100 may output a digital signal stored in the activated target ADC as the digital signal "D".

The input demultiplexer 110 will be described in detail with reference to FIGS. 2 to 4.

The output multiplexer 120 may be connected to the plurality of ADCs. The output multiplexer 120 may receive multiplexing bits from the plurality of ADCs, respectively. For example, the output multiplexer 120 may receive "n" multiplexing bits from "n" ADCs, respectively. The multiplexing bits may include digital bits of the digital signal "D" of each target ADC and dummy bits. The multiplexing bits will be described in detail with reference to FIG. 7.

The output multiplexer 120 may restore the digital signal "D" based on a logic operation of the multiplexing bits. For example, the output multiplexer 120 may output the digital signal "D" based on the logic operation of the digital bits of the digital signal "D" and the dummy bits. The logic operation of the output multiplexer 120 will be described in detail with reference to FIGS. 7 to 9.

The image signal processor 14 may receive the digital signal "D" from the data bus circuit 100. The image signal processor 14 may perform an image signal processing operation based on the digital signal "D". For example, the image signal processor 14 may perform filtering, correction, etc. for the digital signal "D" and may generate image data whose resolution is improved or whose error decreases.

An example in which the digital signal "D" is directly output from the output multiplexer 120 of the data bus circuit 100 to the image signal processor 14 is illustrated in FIG. 1, but the present disclosure is not limited thereto. The data bus circuit 100 may further include a data alignment unit, and the digital signal "D" output from the output multiplexer 120 may be stored in the data alignment unit. For example, when a first digital signal and a second digital signal are sequentially output from the output multiplexer 120, the data alignment unit may sequentially accumulate and store the first digital signal and the second digital signal, and may provide the first digital signal and the second digital signal to the image signal processor 14 at the same time.

FIG. 2 is a block diagram of a data bus circuit of FIG. 1, according to some example embodiments of the present disclosure. Referring to FIG. 2, the data bus circuit 100 of FIG. 1 is illustrated. The data bus circuit 100 may include "n" ADCs (hereinafter referred to as "first to n-th ADCs"), the input demultiplexer 110, and the output multiplexer 120.

The input demultiplexer 110 may receive the selection signal SEL from the selection circuit. The selection signal SEL may be a k-bit signal and may indicate a target ADC of the first to n-th ADCs.

In some example embodiments, the input demultiplexer 110 may receive the selection signal SEL with a k-bit size from the selection circuit through "k" input lines. For example, the selection signal SEL may include first to k-th selection bits, and the input demultiplexer 110 may receive the first to k-th selection bits from the selection circuit through first to k-th input lines.

The input demultiplexer 110 may generate first to n-th enable signals EN1 to ENn based on the selection signal SEL. In some example embodiments, "n" is a natural number which is more than "k" and is less than or equal to "$2^k$".

The input demultiplexer 110 may provide the first to n-th enable signals EN1 to ENn to the first to n-th ADCs, respectively.

For example, the input demultiplexer 110 may provide the first enable signal EN1 to the first ADC. The input demultiplexer 110 may provide the second enable signal EN2 to the second ADC. The input demultiplexer 110 may provide the n-th enable signal ENn to the n-th ADC.

In some example embodiments, the input demultiplexer 110 may provide the first to n-th enable signals EN1 to ENn to the first to n-th ADCs through first to n-th enable lines, respectively. The enable line may indicate a transmission line through which an enable signal is transferred.

Each of the first to n-th enable signals EN1 to ENn may have a 1-bit size. For example, each of the first to n-th enable signals EN1 to ENn may have a logical value of "0" or "1". The input demultiplexer 110 may determine a logical value of each of the first to n-th enable signals EN1 to ENn based on the selection signal SEL.

For example, a target enable signal corresponding to a target ADC which the selection signal SEL indicates may have a logical value of "1". Each of target enable signals corresponding to the remaining ADCs other than the target ADC may have a logical value of "0". The enable signals EN1 to ENn will be described in detail with reference to FIGS. 4 and 5.

The first to n-th ADCs may store first to n-th digital signals D1 to Dn each having an m-bit size in the memory. In some example embodiments, "m" may be an arbitrary natural number.

For example, the first ADC may store the first digital signal D1. The second ADC may store the second digital signal D2. The n-th ADC may store the n-th digital signal Dn.

The first to n-th ADCs may be activated or deactivated respectively based on the first to n-th enable signals EN1 to ENn. For example, an ADC may be activated when the logical value of the corresponding activation signal is "1". An ADC may be deactivated when the logical value of the corresponding activation signal is "0".

The activated target ADC may distribute digital bits of the target digital signal "D" stored therein to some of the first to n-th ADCs. Each of ADCs, which are respectively provided with the digital bits of the target digital signal "D", from among the first to n-th ADCs may output the provided digital bit as a multiplexing bit. Each of ADCs, which are not provided with the digital bits of the target digital signal "D", from among the first to n-th ADCs may output a dummy bit as a multiplexing bit.

For example, the first to n-th ADCs may output the digital bits of the target digital signal "D" and the dummy bits to the output multiplexer 120 as first to n-th multiplexing bits MS1 to MSn. This will be described in detail with reference to FIG. 7.

In some example embodiments, each of the first to n-th ADCs may provide the output multiplexer 120 with one among the first to n-th multiplexing bits MS1 to MSn through one line connected to the output multiplexer 120.

For example, the first ADC may output the first multiplexing bit MS1 to the output multiplexer 120. The second ADC may provide the second multiplexing bit MS2 to the output multiplexer 120. The n-th ADC may provide the n-th multiplexing bit MSn to the output multiplexer 120.

The output multiplexer 120 may receive the first to n-th multiplexing bits MS1 to MSn from the first to n-th ADCs. The output multiplexer 120 may restore the target digital signal "D", based on a logical operation of the first to n-th multiplexing bits MS1 to MSn. The output multiplexer 120 may output the target digital signal "D" to the image signal processor 14.

Although not illustrated, because each of the first to n-th ADCs stores an m-bit digital signal, the first to n-th ADCs may be classified into groups such that ADCs do not overlap each other, and each group may include "m" ADCs. Herein, "m" may be an arbitrary natural number. In some example embodiments, "m" may be a divisor of "n". This will be described in detail with reference to FIG. 7.

In some example embodiments the logical operation may be based on an OR operation of at least two bits among the first to n-th multiplexing bits MS1 to MSn. The logical operation will be described in detail with reference to FIGS. 7 to 9.

In some example embodiments, the output multiplexer 120 may be respectively connected to the first to n-th ADCs through "n" lines. The output multiplexer 120 may output the target digital signal "D" to the image signal processor 14 through "m" output lines. The output line may indicate a transmission line through which the digital signal "D" is transferred.

A conventional image sensor may require "n" input lines in association with the activation of the "n" ADCs and may require "n" output lines in association with the output of the "n" ADCs. To obtain high-definition digital image data, the number of pixel circuits PIX increases, and thus, the number of necessary ADCs increases (e.g., a value of "n" becomes greater). As the number of ADCs increases, input lines and output lines also increase, which causes signal congestion between lines. For example, unlike the input demultiplexer 110 and the output multiplexer 120 which use the same electrical characteristic (e.g., clock signal) as ADCs, the signal congestion is caused when the number of input/output lines between the selection circuit or the image signal processor 14, which uses an electrical characteristic (e.g., clock signal) different from that of the ADCs, and the ADCs increases.

In the image sensor according to the present disclosure, the number of input lines may be less than "n" in association with the activation of "n" ADCs, and the number of output lines may be less than "n" in association with the output of the "n" ADCs (e.g., may be equal to the number of digital bits of the digital signal "D", for example, as denoted by "m"). For example, by using data bus circuit 100 including input multiplexer 110 and output multiplexer 120, the number of input and output lines at the ADCs may be limited and/or reduced in embodiments of the present disclosure, thus reducing signal congestion at the ADCs and improving layout efficiency and reliability of the image sensor.

FIG. 3 is a diagram describing ADCs and an input demultiplexer when "n" is 4, according to some example embodiments of the present disclosure. Referring to FIG. 3, for better understanding of the present disclosure, the input demultiplexer 110 will be described under the assumption that the number of ADCs is 4. However, the present disclosure is not limited thereto. For example, the number of ADCs may be more than or less than 4.

The input demultiplexer 110 may receive the 2-bit selection signal SEL (e.g., the selection signal SEL of log 24 bits) from the selection circuit. The selection signal SEL may indicate one target ADC among the first to fourth ADCs.

The input demultiplexer 110 may generate first to fourth enable signals EN1 to EN4 based on the selection signal SEL. An enable signal corresponding to the target ADC from among the first to fourth enable signals EN1 to EN4 may have a logical value of "1", and the remaining enable signals may have a logical value of "0".

The input demultiplexer 110 may provide the first to fourth enable signals EN1 to EN4 to the first to fourth ADCs, respectively. For example, the input demultiplexer 110 may provide the first enable signal EN1 to the first ADC. The input demultiplexer 110 may provide the second enable signal EN2 to the second ADC. The input demultiplexer 110 may provide the third enable signal EN3 to the third ADC. The input demultiplexer 110 may provide the fourth enable signal EN4 to the fourth ADC.

The target ADC among the first to fourth ADCs may be activated by the corresponding enable signal.

FIG. 4 is a diagram describing a selection signal and enable signals when "n" is 4, according to some example embodiments of the present disclosure. The selection signal SEL and the first to fourth enable signals EN1 to EN4 will be described with reference to FIG. 4.

The selection signal SEL may indicate a target ADC among the first to fourth ADCs and may have a 2-bit size. The first to fourth enable signals EN1 to EN4 may respectively correspond to the first to fourth ADCs.

When a combination of the selection bits of the selection signal SEL is "00", the target ADC may be the first ADC. In some example embodiments, the logical value of the first enable signal EN1 corresponding to the first ADC may be "1", and the logical values of the remaining enable signals EN2 to EN4 may be "0".

When a combination of the selection bits of the selection signal SEL is "01", the target ADC may be the second ADC. In some example embodiments, the logical value of the second enable signal EN2 corresponding to the second ADC may be "1", and the logical values of the remaining enable signals EN1, EN3, and EN4 may be "0".

When a combination of the selection bits of the selection signal SEL is "10", the target ADC may be the third ADC. In some example embodiments, the logical value of the third enable signal EN3 corresponding to the third ADC may be "1", and the logical values of the remaining enable signals EN1, EN2, and EN4 may be "0".

When a combination of the selection bits of the selection signal SEL is "11", the target ADC may be the fourth ADC. In some example embodiments, the logical value of the fourth enable signal EN4 corresponding to the fourth ADC may be "1", and the logical values of the remaining enable signals EN1 to EN3 may be "0".

The table of FIG. 4 shows the relationship between the selection signal SEL and the first to fourth enable signals EN1 to EN4 as an example, but the present disclosure is not limited thereto. A target ADC corresponding to each of combinations of the selection bits of the selection signal SEL may be variable.

FIG. 5 is a diagram describing a selection signal and enable signals when "n" is 4, according to some example embodiments of the present disclosure. Changes of the selection signal SEL and the first to fourth enable signals EN1 to EN4 over time will be described with reference to FIG. 5.

To output all the digital signals stored in the first to fourth ADCs, the selection signal SEL may sequentially indicate the first to fourth ADCs. However, the present disclosure is not limited thereto. For example, the order of selecting the target ADC among the first fourth ADCs may be changed.

A combination of the selection bits of the selection signal SEL may be "00" from a first point in time t1 to a second point in time t2. For example, a target ADC which the selection signal SEL indicates may be the first ADC. From the first point in time t1 to the second point in time t2, the first enable signal EN1 corresponding to the first ADC may be high, and the remaining enable signals EN2 to EN4 may be low.

A combination of the selection bits of the selection signal SEL may be "01" from the second point in time t2 to a third point in time t3. For example, a target ADC which the selection signal SEL indicates may be the second ADC. From the second point in time t2 to the third point in time t3, the second enable signal EN2 corresponding to the second ADC may be high, and the remaining enable signals EN1, EN3, and EN4 may be low.

A combination of the selection bits of the selection signal SEL may be "10" from the third point in time t3 to a fourth point in time t4. For example, a target ADC which the selection signal SEL indicates may be the third ADC. From the third point in time t3 to the fourth point in time t4, the third enable signal EN3 corresponding to the third ADC may be high, and the remaining enable signals EN1, EN2, and EN4 may be low.

A combination of the selection bits of the selection signal SEL may be "11" from the fourth point in time t4 to a fifth point in time t5. For example, a target ADC which the selection signal SEL indicates may be the fourth ADC. From the fourth point in time t4 to the fifth point in time t5, the fourth enable signal EN4 corresponding to the fourth ADC may be high, and the remaining enable signals EN1, EN2, and EN3 may be low.

However, the present disclosure is not limited thereto. For example, a target ADC corresponding to each of the combinations of the selection bits of the selection signal SEL may be different from that of FIG. 5.

FIG. 6 is a diagram describing ADCs and an output multiplexer when "n" is 4, according to some example embodiments of the present disclosure. Referring to FIG. 6, for better understanding of the present disclosure, the output multiplexer 120 will be described under the assumption that the number of ADCs is 4. However, the present disclosure is not limited thereto. For example, the number of ADCs may be more than or less than 4. For convenience of description, the case where the first ADC among the first to fourth ADCs is activated by a first enable signal provided from the input demultiplexer 110 of FIG. 3 will be described below.

As in the above description given with reference to FIG. 3, the first to fourth ADCs respectively store the first to fourth digital signals D1 to D4. For example, each of the first to fourth digital signals D1 to D4 may have a 2-bit size. However, the present disclosure is not limited thereto. For example, the number of bits of each of the first to fourth digital signals D1 to D4 may be less than 2 or may be more than 2.

The activated first ADC may distribute digital bits of the first digital signal D1 to some of the first to fourth ADCs. Each of ADCs, to which digital bits of the first digital signal D1 are distributed, from among the first to fourth ADCs may output the provided digital bit to the output multiplexer 120 as the multiplexing bit MS, and the remaining ADCs may output dummy bits to the output multiplexer 120 as the multiplexing bit MS.

For example, the first to fourth multiplexing bits MS1 to MS4 may include two digital bits among the digital bits of the first digital signal D1 and two dummy bits.

For example, the first multiplexing bit MS1 may correspond to the first digital bit among the digital bits of the first digital signal D1. The second multiplexing bit MS2 may correspond to the second digital bit among the digital bits of the first digital signal D1. Each of the third multiplexing bit MS3 and the fourth multiplexing bit MS4 may be a dummy bit.

The output multiplexer 120 may receive the first to fourth multiplexing bits MS1 to MS4 from the first to fourth ADCs, respectively.

In some example embodiments, the output multiplexer 120 may be connected to each of the first to fourth ADCs through one line and may receive one multiplexing bit from each of the first to fourth ADCs through one line.

The output multiplexer 120 may restore the first digital signal D1, based on a logical operation of the first to fourth multiplexing bits MS1 to MS4. The output multiplexer 120 may output the first digital signal D1 to the image signal processor 14 of FIG. 1.

In some example embodiments, the output multiplexer 120 may output the digital bits of the first digital signal D1 to the image signal processor 14 of FIG. 4 through two output lines, respectively. For example, the number of output lines may be equal to the number of digital bits of the first digital signal D1. For example, the first digital signal D1 which is a 2-bit signal may include 2 digital bits. For example, the number of output lines may be 2.

FIG. 7 is a diagram detail describing ADCs and an output multiplexer when "n" is 4 and "m" is 2 in detail, according to some example embodiments of the present disclosure. ADCs and the output multiplexer 120 will be described with reference to FIG. 7 under the assumption that the data bus circuit 100 of FIG. 1 include four ADCs and each of the ADCs stores a 2-bit digital signal "D".

For convenience of description, the case where n=4 and m=2 will be described as an example, but the present disclosure is not limited thereto. For example, "n" and "m" may be changed.

The first to fourth ADCs may respectively store the first to fourth digital signals D1 to D4. Each of the first to fourth digital signals D1 to D4 may include two digital bits.

For example, the first ADC may store a first digital bit D11 and a second digital bit D12. The second ADC may store a first digital bit D21 and a second digital bit D22. The third ADC may store a first digital bit D31 and a second digital bit D32. The fourth ADC may store a first digital bit D41 and a second digital bit D42.

The first to fourth ADCs may be classified into groups, each group may include ADCs, the number of which is equal to the number of digital bits of the digital signal "D" stored in each ADC, and the ADCs of each group may be connected to each other. For example, because m=2, each group may include two ADCs which are connected so as not to overlap each other. For example, the first and second ADCs may be connected to each other, and the third and fourth ADCs may be connected to each other.

The first ADC activated from among the first to fourth ADCs may distribute the digital bits D11 and D12 of the first digital signal D1 to the second ADC connected to the first ADC.

In some example embodiments, the first ADC and the second ADC may be connected by a first bit output line of the first ADC and a second bit output line of the second ADC.

For example, the first bit output line may be included in the first ADC. The first bit output line may receive the first digital bit D11 from the memory of the first ADC and may receive the first digital bit D21 from the memory of the second ADC. The first bit output line may output the first digital bit D11 or the first digital bit D21 as the first multiplexing bit MS1.

As another example, the second bit output line may be included in the second ADC. The second bit output line may receive the second digital bit D12 from the memory of the first ADC. The second bit output line may receive the second digital bit D22 from the memory of the second ADC. The second bit output line may output the second digital bit D12 or the second digital bit D22 as the second multiplexing bit MS2.

For example, the activated first ADC may distribute the first digital bit D11 to the first ADC connected to the first bit output line and may distribute the second digital bit D12 to the second ADC connected to the second bit output line. However, the present disclosure is not limited thereto. For example, the first ADC may distribute the first digital bit D11 and the second digital bit D12 to the second ADC and the first ADC, respectively, or the first ADC may be connected to the third ADC or the fourth ADC, not the second ADC.

As in the first bit output line of the first ADC, the third ADC may include a first bit output line. The first bit output line may output the first digital bit D31 or the first digital bit D41 as the third multiplexing bit MS3.

As in the second bit output line of the second ADC, the fourth ADC may include a second bit output line. The second bit output line may output the second digital bit D32 or the second digital bit D42 as the fourth multiplexing bit MS4.

Each of the remaining ADCs other than the activated first ADC and the second ADC connected to the activated first ADC may output a dummy bit as a multiplexing bit. The third ADC may output a dummy bit through a first bit output line as the third multiplexing bit MS3. The fourth ADC may output a dummy bit through a second bit output line as the fourth multiplexing bit MS4.

The output multiplexer 120 may include a plurality of logic circuits. For example, the output multiplexer 120 may include a first logic circuit and a second logic circuit.

The first logic circuit may receive the first multiplexing bit MS1 from the first ADC including the first bit output line. The first logic circuit may receive the third multiplexing bit MS3 from the third ADC not connected to the first ADC and including the first bit output line. The first logic circuit may restore a first digital bit (e.g., D11) of a target digital signal, based on a logical operation of the first multiplexing bit MS1 and the third multiplexing bit MS3.

In some example embodiments, the logical operation of the first logic circuit may indicate an OR operation. For example, because the first multiplexing bit MS1 is the first digital bit D11 of the first digital signal D1 and the third multiplexing bit MS3 is a dummy bit, a result value of the OR operation of the first multiplexing bit MS1 and the third multiplexing bit MS3 may be the first digital bit D11.

The second logic circuit may receive the second multiplexing bit MS2 from the second ADC connected to the first ADC and including the second bit output line. The second logic circuit may receive the fourth multiplexing bit MS4 from the fourth ADC which is not connected to the first ADC, is connected to the third ADC, and includes the second bit output line. The second logic circuit may restore a second digital bit (e.g., D12) of a target digital signal, based on a logical operation of the second multiplexing bit MS2 and the fourth multiplexing bit MS4.

In some example embodiments, the logical operation of the second logic circuit may indicate an OR operation. For example, because the second multiplexing bit MS2 is the second digital bit D12 of the first digital signal D1 and the fourth multiplexing bit MS4 is a dummy bit, a result value of the OR operation of the second multiplexing bit MS2 and the fourth multiplexing bit MS4 may be the second digital bit D12.

The first logic circuit and the second logic circuit may respectively output the first digital bit D11 and the second digital bit D12 of the target digital signal to the image signal processor 14 of FIG. 1.

The case where each of four ADCs stores a 2-bit digital signal is described with reference to FIG. 7, but the present disclosure is not limited thereto. The operation corresponding to the case where "m" and "n" are changed is similar to the operation described with reference to FIG. 7. For better understanding, the operation corresponding to the case where "m" and "n" are changed will be described with reference to FIGS. 8 and 9.

FIG. 8 is a diagram describing ADCs and an output multiplexer when "n" is 8 and "m" is 2 in detail, according to some example embodiments of the present disclosure. Operations of ADCs and the output multiplexer 120 will be described with reference to FIG. 8 under the assumption that each of eight ADCs stores a digital signal with a 2-bit size.

For convenience of description, it is assumed that a first ADC among first to eighth ADCs is activated as a target ADC. In some example embodiments, an input demultiplexer may receive a 3-bit selection signal from the selection circuit and may provide first to eighth enable signals to the first to eighth ADCs, respectively, based on the selection signal.

Because each of the first to eighth ADCs stores a 2-bit digital signal, the first to eighth ADCs may be classified into four groups such that ADCs do not overlap each other, and thus, each group may include two ADCs.

For example, the first ADC and the second ADC may be connected to each other. The third ADC and the fourth ADC may be connected to each other. The fifth ADC and the sixth ADC may be connected to each other. The seventh ADC and the eighth ADC may be connected to each other.

Also, as in the above ADCs described with reference to FIG. 7, each of the first ADC, the third ADC, the fifth ADC, and the seventh ADC may include a first bit output line, and each of the second ADC, the fourth ADC, the sixth ADC, and the eighth ADC may include a second bit output line.

The activated first ADC may distribute the digital bits D11 and D12 of the first digital signal D1 stored therein to the first ADC and the second ADC connected to the first ADC.

For example, the first bit output line of the first ADC may provide the first digital bit D11 to the output multiplexer 120 as the first multiplexing bit MS1. The second bit output line of the second ADC may provide the second digital bit D12 to the output multiplexer 120 as the second multiplexing bit MS2.

Each of the remaining ADCs other than the first ADC being a target ADC and the second ADC connected to the first ADC may output a dummy bit to the output multiplexer 120 as a multiplexing bit.

For example, the third to eighth ADCs may provide dummy bits to the output multiplexer 120 as third to eighth multiplexing bits MS3 to MS8, respectively. In some example embodiments, the dummy bit may correspond to a logical value of "0".

The output multiplexer 120 may include a plurality of logic circuits. For example, the output multiplexer 120 may include first to sixth logic circuits.

The first logic circuit may receive the first multiplexing bit MS1 from the first ADC including the first bit output line. The first logic circuit may receive the third multiplexing bit MS3 from the third ADC which is not connected to the first ADC and is one of ADCs each including the first bit output line.

Also, the first logic circuit may output a value of the first digital bit D11 corresponding to the first multiplexing bit MS1 to the fifth logic circuit as a first result value R1, based on a logical operation of the first multiplexing bit MS1 and the third multiplexing bit MS3.

The second logic circuit may receive the fifth multiplexing bit MS5 from the fifth ADC which is not connected to the first ADC or the third ADC and is one of the ADCs each including the first bit output line. The second logic circuit may receive the seventh multiplexing bit MS7 from the seventh ADC which is not connected to the first ADC, the third ADC, or the fifth ADC and is one of ADCs each including the first bit output line.

Also, the second logic circuit may output a dummy bit value (e.g., "0") to the fifth logic circuit as a second result value R2, based on a logical operation of the fifth multiplexing bit MS5 and the seventh multiplexing bit MS7.

The third logic circuit may receive the second multiplexing bit MS2 from the second ADC connected to the first ADC and including the second bit output line. The third logic circuit may receive the fourth multiplexing bit MS4 from the fourth ADC which is not connected to the first ADC, is connected to the third ADC, and includes the second bit output line.

Also, the third logic circuit may output a value of the second digital bit D12 corresponding to the second multiplexing bit MS2 to the sixth logic circuit as a third result value R3, based on a logical operation of the second multiplexing bit MS2 and the fourth multiplexing bit MS4.

The fourth logic circuit may receive the sixth multiplexing bit MS6 from the sixth ADC which is connected to the fifth ADC and includes the second bit output line. The fourth logic circuit may receive the eighth multiplexing bit MS8 from the eighth ADC which is connected to the seventh ADC and includes the second bit output line.

Also, the fourth logic circuit may output a dummy bit value (e.g., "0") to the sixth logic circuit as a fourth result value R4, based on a logical operation of the sixth multiplexing bit MS6 and the eighth multiplexing bit MS8.

The fifth logic circuit may output the first digital bit D11 to the image signal processor 14 of FIG. 1, based on a logical operation of the first result value R1 and the second result value R2.

The sixth logic circuit may output the second digital bit D12 to the image signal processor 14 of FIG. 1, based on a logical operation of the third result value R3 and the fourth result value R4.

That is, the output multiplexer 120 may restore the digital bits D11 and D12 stored in the target ADC and may output the first and second digital bits D11 and D12 to the image signal processor 14 of FIG. 1.

FIG. 9 is a diagram describing ADCs and an output multiplexer when "n" is 8 and "m" is 4 in detail, according to some example embodiments of the present disclosure. Operations of ADCs and the output multiplexer 120 will be described with reference to FIG. 9 under the assumption that each of eight ADCs stores a 4-bit digital signal.

For convenience of description, it is assumed that a first ADC among first to eighth ADCs is activated as a target ADC. The first digital signal D1 of the first ADC may include first to fourth digital bits D11, D12, D13, and D14. For example, an input demultiplexer may receive a selection signal with a 3-bit size from the selection circuit and may provide first to eighth enable signals to the first to eighth ADCs, respectively, based on the selection signal.

Because each of the first to eighth ADCs stores a 4-bit digital signal, the first to eighth ADCs may be classified into two groups such that ADCs do not overlap each other, and thus, each group may include four ADCs. For example, the first to fourth ADCs may be connected to each other. The fifth to eighth ADCs may be connected to each other.

In detail, as in the above description given with reference to FIG. 7, each of the first ADC and the fifth ADC may include a first bit output line. Each of the second ADC and the sixth ADC may include a second bit output line. Each of the third ADC and seventh ADC may include a third bit output line. Each of the fourth ADC and the eighth ADC may include a fourth bit output line.

The activated first ADC may distribute the digital bits D11, D12, D13, and D14 of the first digital signal D1 to some of the first to eighth ADCs.

For example, the first ADC may distribute the digital bits D11, D12, D13, and D14 to the first ADC and the second to fourth ADCs connected to the first ADC. For example, the first ADC may output the first digital bit D11 to the output multiplexer 120 as the first multiplexing bit MS1. The second ADC may output the second digital bit D12 to the output multiplexer 120 as the second multiplexing bit MS2. The third ADC may output the third digital bit D13 to the output multiplexer 120 as the third multiplexing bit MS3. The fourth ADC may output the fourth digital bit D14 to the output multiplexer 120 as the fourth multiplexing bit MS4.

The remaining ADCs (e.g., the fifth to eighth ADCs) not connected to the first ADC may output dummy bits to the output multiplexer 120 as the fifth to eighth multiplexing bits MS5 to MS8, respectively.

The output multiplexer 120 may include a plurality of logic circuits. For example, the output multiplexer 120 may include first to fourth logic circuits.

The first logic circuit may receive the first multiplexing bit MS1 from the first ADC including the first bit output line. The first logic circuit may receive the fifth multiplexing bit MS5 from the fifth ADC not connected to the first ADC and including the first bit output line.

Also, the first logic circuit may output the first digital bit D11 to the image signal processor 14 of FIG. 1, based on a logical operation of the first multiplexing bit MS1 and the fifth multiplexing bit MS5.

The second logic circuit may receive the second multiplexing bit MS2 from the second ADC including the second bit output line. The second logic circuit may receive the sixth multiplexing bit MS6 from the sixth ADC not connected to the first ADC and including the second bit output line.

Also, the second logic circuit may output the second digital bit D12 to the image signal processor 14 of FIG. 2, based on a logical operation of the second multiplexing bit MS2 and the sixth multiplexing bit MS6.

The third logic circuit may receive the third multiplexing bit MS3 from the third ADC including the third bit output line. The third logic circuit may receive the seventh multiplexing bit MS7 from the seventh ADC not connected to the first ADC and including the third bit output line.

Also, the third logic circuit may output the third digital bit D13 to the image signal processor 14 of FIG. 3, based on a logical operation of the third multiplexing bit MS3 and the seventh multiplexing bit MS7.

The fourth logic circuit may receive the fourth multiplexing bit MS4 from the fourth ADC including the fourth bit output line. The fourth logic circuit may receive the eighth multiplexing bit MS8 from the eighth ADC not connected to the first ADC and including the fourth bit output line.

Also, the fourth logic circuit may output the fourth digital bit D14 to the image signal processor 14 of FIG. 4, based on a logical operation of the fourth multiplexing bit MS4 and the eighth multiplexing bit MS8.

FIG. 10 is a block diagram of a data bus circuit including a plurality of input demultiplexers and a plurality of output multiplexers according to some example embodiments of the present disclosure. For convenience of description, FIG. 10 shows a data bus circuit including two input demultiplexers and two output multiplexers, but the present disclosure is not limited thereto. For example, the number of input demultiplexers and the number of output multiplexers may be more than 2.

A data bus circuit 200 may include first to 2n-th ADCs, an input demultiplexer 210, and an output multiplexer 220.

The first to 2n-th ADCs may respectively store first to 2n-th digital signals D1 to D2n. Each of the first to 2n-th digital signals D1 to D2n may be a digital signal with an m-bit size.

The input demultiplexer 210 may include a first demultiplexer 211 and a second demultiplexer 212.

The first demultiplexer 211 may receive a first selection signal SEL1 from the selection circuit. The first selection signal SEL1 may indicate a first target ADC and may have a k-bit size. The first target ADC may be one of the first to n-th ADCs. The first demultiplexer 211 may generate first to n-th enable signals EN1 to ENn based on the first selection signal SEL1. The first demultiplexer 211 may provide the first to n-th enable signals EN1 to ENn to the first to n-th ADCs, respectively.

The second demultiplexer 212 may receive a second selection signal SEL2 from the selection circuit. The second selection signal SEL2 may indicate a second target ADC and may have a k-bit size. The second target ADC may be one of the (n+1)-th to 2n-th ADCs. The second demultiplexer 212 may generate (n+1)-th to 2n-th enable signals ENn+1 to EN2n based on the second selection signal SEL2. The second demultiplexer 212 may provide the (n+1)-th to 2n-th enable signals ENn+1 to EN2n to the (n+1)-th to 2n-th ADCs, respectively.

The output multiplexer 220 may include a first multiplexer 221 and a second multiplexer 222.

The first multiplexer 221 may receive the first to n-th multiplexing bits MS1 to MSn from the first to n-th ADCs, respectively. The first to n-th multiplexing bits MS1 to MSn may respectively correspond to digital bits of a first target digital signal Dt1, which the first target ADC stores, and dummy bits. The first multiplexer 221 may restore the first target digital signal Dt1 based on the first to n-th multiplexing bits MS1 to MSn and may output the first target digital signal Dt1 to the image signal processor 14 of FIG. 1.

The second multiplexer 222 may receive the (n+1)-th to 2n-th multiplexing bits MSn+1 to MS2n from the (n+1)-th to 2n-th ADCs, respectively. The (n+1)-th to 2n-th multiplexing bits MSn+1 to MS2n may respectively correspond to digital bits of a second target digital signal Dt2, which a second target ADC stores, and dummy bits. The second multiplexer 222 may restore the second target digital signal Dt2 based on the (n+1)-th to 2n-th multiplexing bits MSn+1 to MS2n and may output the second target digital signal Dt2 to the image signal processor 14 of FIG. 1.

An example in which the first selection signal SEL1 and the second selection signal SEL2 are output from one selection circuit is illustrated in FIG. 10, but the present disclosure is not limited thereto. In some example embodiments, the image sensor may include a plurality of selection circuits. For example, the image sensor may include a first selection circuit and a second selection circuit. The first selection circuit may provide the first selection signal SEL1 to the first demultiplexer 211. The second selection circuit may provide the second selection signal SEL2 to the second demultiplexer 212.

An input demultiplexer of a data bus circuit according to the present disclosure may activate a plurality of ADCs quickly through a plurality of demultiplexers. Also, an output multiplexer may restore digital signals stored in the quickly activated ADCs through a plurality of multiplexers so as to be output to the image signal processor 14.

FIG. 11 is a diagram describing ADCs and a plurality of input demultiplexers of FIG. 10 when "n" is 4, according to some example embodiments of the present disclosure. Referring to FIG. 11, a data bus circuit may include eight ADCs and the input demultiplexer 210. The input demultiplexer 210 may include the first demultiplexer 211 and the second demultiplexer 212.

The first demultiplexer 211 may receive the first selection signal SEL1 from the selection circuit. The first selection signal SEL1 may have a 2-bit size and may indicate a first target ADC among the first to fourth ADCs. The first demultiplexer 211 may generate the first to fourth enable signals EN1 to EN4 based on the first selection signal SEL1. The first demultiplexer 211 may provide the first to fourth enable signals EN1 to EN4 to the first to fourth ADCs, respectively.

For example, a target enable signal corresponding to the first target ADC from among the first to fourth enable signals EN1 to EN4 may be high. Enable signals corresponding to the remaining ADCs from among the first to fourth enable signals EN1 to EN4 may be low.

In some example embodiments, the first demultiplexer 211 may receive the first selection signal SEL1 from the selection circuit through two input lines.

The second demultiplexer 212 may receive the second selection signal SEL2 from the selection circuit. The second selection signal SEL2 may have a 2-bit size and may indicate a second target ADC among the fifth to eighth ADCs. The second demultiplexer 212 may generate the fifth to eighth enable signals EN5 to EN8 based on the second selection signal SEL2. The second demultiplexer 212 may provide the fifth to eighth enable signals EN5 to EN8 to the fifth to eighth ADCs, respectively.

For example, a target enable signal corresponding to the second target ADC from among the fifth to eighth enable signals EN5 to EN8 may be high. Enable signals corresponding to the remaining ADCs from among the fifth to eighth enable signals EN5 to EN8 may be low.

In some example embodiments, the second demultiplexer 212 may receive the second selection signal SEL2 from the selection circuit through two input lines.

FIG. 12 is a diagram describing ADCs and a plurality of output multiplexers of FIG. 10 when "n" is 4, according to some example embodiments of the present disclosure. Referring to FIG. 12, a data bus circuit may include eight ADCs and the output multiplexer 220. The output multiplexer 220 may include the first multiplexer 221 and the second multiplexer 222.

The first multiplexer 221 may receive the first to fourth multiplexing bits MS1 to MS4 from the first to fourth ADCs, respectively. The first to fourth multiplexing bits MS1 to MS4 may respectively correspond to digital bits of a target digital signal, which the first target ADC stores, and dummy bits.

For example, when the first ADC is a first target ADC, the first to fourth multiplexing bits MS1 to MS4 may respectively correspond to the digital bits D11 and D12 of the first digital signal D1, which the first ADC stores, and dummy bits. For example, the first multiplexing bit MS1 may be the first digital bit D11. The second multiplexing bit MS2 may be the second digital bit D12. Each of the third multiplexing bit MS3 and the fourth multiplexing bit MS4 may be a dummy bit.

The first multiplexer 221 may restore the target digital signal, which the first target ADC stores, based on a logical operation of the first to fourth multiplexing bits MS1 to MS4. For example, the first multiplexer 221 may restore the first digital signal D1 of the first ADC so as to be output to the image signal processor 14 of FIG. 1.

The second multiplexer 222 may receive the fifth to eighth multiplexing bits MS5 to MS8 from the fifth to eighth ADCs, respectively. The fifth to eighth multiplexing bits MS5 to MS8 may respectively correspond to digital bits of a target digital signal, which a second target ADC stores, and dummy bits.

For example, when the fifth ADC is a second target ADC, the fifth to eighth multiplexing bits MS5 to MS8 may respectively correspond to digital bits D51 and D52 of the fifth digital signal D5, which the fifth ADC stores, and dummy bits. For example, the fifth multiplexing bit MS5 may be the first digital bit D51. The sixth multiplexing bit MS6 may be the second digital bit D52. Each of the seventh multiplexing bit MS7 and the eighth multiplexing bit MS8 may be a dummy bit.

The second multiplexer 222 may restore the target digital signal, which the second target ADC stores, based on a logical operation of the fifth to eighth multiplexing bits MS5 to MS8. For example, the second multiplexer 222 may restore the fifth digital signal D5 of the fifth ADC so as to be output to the image signal processor 14 of FIG. 1.

FIG. 13 is a diagram describing ADCs and a plurality of output multiplexers of FIG. 10 when "n" is 4 and "m" is 2 in detail, according to some example embodiments of the present disclosure. Eight ADCs and the output multiplexer 220 (including first and second multiplexers 221 and 222) will be described with reference to FIG. 13 under the assumption that each of the eight ADCs stores a digital signal with a 2-bit size.

For convenience of description, the description will be given as a first target ADC is a first ADC and a second target ADC is a fifth ADC, but the present disclosure is not limited thereto.

Because each of the first to eighth ADCs stores a 2-bit digital signal, although not illustrated in FIG. 13, the first to eighth ADCs may be classified into four groups such that ADCs do not overlap each other, and thus, each group may include two ADCs.

For example, the first ADC and the second ADC may be connected to each other. The third ADC and the fourth ADC may be connected to each other. The fifth ADC and the sixth ADC may be connected to each other. The seventh ADC and the eighth ADC may be connected to each other. For example, as in the above ADCs described with reference to FIG. 7, each of the first ADC, the third ADC, the fifth ADC, and the seventh ADC may include a first bit output line, and each of the second ADC, the fourth ADC, the sixth ADC, and the eighth ADC may include a second bit output line.

The activated first ADC may distribute the digital bits D11 and D12 of the first digital signal D1 to the first to fourth ADCs.

For example, the first ADC including the first bit output line may output the first digital bit D11 to the first multiplexer 221 as the first multiplexing bit MS1. The second ADC including the second bit output line may output the second digital bit D12 to the first multiplexer 221 as the second multiplexing bit MS2. The third ADC and the fourth ADC which are not connected to the first ADC may output dummy bits to the first multiplexer 221 as the third multiplexing bit MS3 and the fourth multiplexing bit MS4, respectively.

The activated fifth ADC may distribute the digital bits D51 and D52 of the fifth digital signal D5 to the fifth ADC and the sixth to eighth ADCs.

For example, the fifth ADC including the first bit output line may output the first digital bit D51 to the second multiplexer 222 as the fifth multiplexing bit MS5. The sixth ADC including the second bit output line may output the second digital bit D52 to the second multiplexer 222 as the sixth multiplexing bit MS6. The seventh ADC and the eighth ADC which are not connected to the fifth ADC may output dummy bits to the second multiplexer 222 as the seventh multiplexing bit MS7 and the eighth multiplexing bit MS8, respectively.

The first multiplexer 221 may include a plurality of logic circuits. For example, the first multiplexer 221 may include a first logic circuit and a second logic circuit.

The first logic circuit may receive the first multiplexing bit MS1 from the first ADC including the first bit output line. The first logic circuit may receive the third multiplexing bit MS3 from the third ADC not connected to the first ADC and including the first bit output line.

Also, the first logic circuit may output the first digital bit D11 of a first target digital signal (e.g., D1), based on a logical operation of the first multiplexing bit MS1 and the third multiplexing bit MS3.

The second logic circuit may receive the second multiplexing bit MS2 from the second ADC connected to the first ADC and including the second bit output line. The second logic circuit may receive the fourth multiplexing bit MS4 from the fourth ADC which is not connected to the first ADC, is connected to the third ADC, and includes the second bit output line.

Also, the second logic circuit may output the second digital bit D12 of the first target digital signal (e.g., D1), based on a logical operation of the second multiplexing bit MS2 and the fourth multiplexing bit MS4.

The second multiplexer 222 may include a plurality of logic circuits. For example, the second multiplexer 222 may include a third logic circuit and a fourth logic circuit. The third logic circuit may receive the fifth multiplexing bit MS5 from the fifth ADC including the first bit output line. The third logic circuit may receive the seventh multiplexing bit MS7 from the seventh ADC not connected to the fifth ADC and including the first bit output line.

Also, the third logic circuit may output the first digital bit D51 of a second target digital signal (e.g., D5), based on a logical operation of the fifth multiplexing bit MS5 and the seventh multiplexing bit MS7.

The fourth logic circuit may receive the sixth multiplexing bit MS6 from the sixth ADC which is connected to the fifth ADC and includes the second bit output line. The fourth logic circuit may receive the eighth multiplexing bit MS8 from the eighth ADC which is not connected to the fifth ADC, is connected to the seventh ADC, and includes the second bit output line.

Also, the fourth logic circuit may output the first digital bit D52 of the second target digital signal (e.g., D5), based on a logical operation of the sixth multiplexing bit MS6 and the eighth multiplexing bit MS8.

FIG. 14 is a flowchart describing an operation method of an image sensor according to some example embodiments of the present disclosure. The operation method of the image sensor 10 of FIG. 1 will be described with reference to FIG. 14. An image sensor may include a selection circuit, first to n-th ADCs, an input demultiplexer, and an output multiplexer.

In operation S110, the selection circuit of the image sensor may generate a selection signal which indicates a target ADC among the first to n-th ADCs and has a k-bit size.

In some example embodiments, the selection circuit may output first to k-th selection bits of the selection signal to the input demultiplexer through "k" input lines.

In operation S120, the input demultiplexer of the image sensor may generate first to n-th enable signals each having a 1-bit size, based on the selection signal.

In some example embodiments, operation S120 may include generating a target enable signal corresponding to a target ADC from among the first to n-th enable signals so as to have a logical value of "1" and generating the remaining enable signals among the first to n-th enable signals other than the target enable signal so as to have a logical value of "0".

In operation S130, the input demultiplexer of the image sensor may output the first to n-th enable signals to the first to n-th ADCs, respectively.

In operation S140, the target ADC of the image sensor may distribute digital bits of a target digital signal to some of the first to n-th ADCs in response to the corresponding target enable signal among the first to n-th enable signals.

In operation S150, the first to n-th ADCs of the image sensor may respectively output first to n-th multiplexing bits to the output multiplexer, and each of the first to n-th multiplexing bits may correspond to one of the digital bits or a dummy bit.

In operation S160, the output multiplexer of the image sensor may output a target digital signal based on a logical operation of the first to n-th multiplexing bits.

In some example embodiments, the logical operation may be based on an OR operation of at least two multiplexing bits among the first to n-th multiplexing bits.

In some example embodiments, operation S160 may include outputting a first bit of the target digital signal based on an OR operation of multiplexing bits output from ADCs each including a first bit output line and outputting a second bit of the target digital signal based on an OR operation of multiplexing bits output from ADCs each including a second bit output line.

In some example embodiments, when the target digital signal includes first to m-th digital bits, the output multiplexer may output the first to m-th digital bits through first to m-th output lines, respectively.

According to some example embodiments of the present disclosure, an image sensor including analog-to-digital converters connected to a demultiplexer and a multiplexer and an operation method thereof are provided.

Also, an image sensor in which an input signal to ADCs is received through a demultiplexer and an output signal of an ADC is output through a multiplexer such that the number of input lines and the number of output lines decrease and signal congestion decreases is provided.

One or more of the elements disclosed above may include or be implemented in processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An image sensor comprising:

first to n-th analog-to-digital converters (ADCs);

a selection circuit configured to generate a selection signal indicating a target ADC from among the first to n-th ADCs, the selection signal having k-bit size;

an input demultiplexer configured to generate first to n-th enable signals each having 1-bit size based on the selection signal and to output the first to n-th enable signals to the first to n-th ADCs, respectively; and an output multiplexer connected to the first to n-th ADCs, wherein the target ADC is configured to distribute digital bits of a target digital signal to some of the first to n-th ADCs in response to a target enable signal corresponding to the target ADC from among the first to n-th enable signals, wherein the first to n-th ADCs are respectively configured to output first to n-th multiplexing bits each corresponding to one of the distributed digital bits of the target digital signal or a dummy bit to the output multiplexer, wherein the output multiplexer is further configured to output the target digital signal based on a logical operation of the first to n-th multiplexing bits, and wherein k is an arbitrary natural number, and n is a natural number more than k and less than or equal to $2^k$.

2. The image sensor of claim 1, wherein the selection circuit is further configured to output first to k-th selection bits of the selection signal to the input demultiplexer through "k" input lines, respectively.

3. The image sensor of claim 1, wherein the input demultiplexer is further configured to generate the target enable signal corresponding to the target ADC from among the first to n-th enable signals as having a logical value of "1" and generate remaining enable signals from among the first to n-th enable signals as having a logical value of "0", based on the selection signal.

4. The image sensor of claim 1, wherein the target digital signal has m-bit size and includes first to m-th digital bits, wherein the output multiplexer is further configured to output the first to m-th digital bits through first to m-th output lines, respectively, and wherein m is an arbitrary natural number.

5. The image sensor of claim 1, wherein the target digital signal has m-bit size and includes first to m-th digital bits, wherein the first to n-th ADCs are classified into groups that do not overlap each other, wherein each of the groups includes "m" ADCs from among the first to n-th ADCs, wherein the target ADC is configured to distribute the first to m-th digital bits to the target ADC and (m−1) ADCs from among the first to n-th ADCs connected to the target ADC, in response to the target enable signal, wherein the target ADC and the (m−1) ADCs connected to the target ADC are respectively configured to output the first to m-th digital bits to the output multiplexer, and wherein m is an arbitrary natural number.

6. The image sensor of claim 5, wherein each of remaining ADCs from among the first to n-th ADCs other than the target ADC and the (m−1) ADCs connected to the target ADC are configured to output the dummy bit having the 1-bit size to the output multiplexer.

7. The image sensor of claim 1, wherein the target ADC is a first target ADC, wherein the selection signal is a first selection signal, wherein the input demultiplexer is a first input demultiplexer, wherein the image sensor further comprises (n+1)-th to 2n-th ADCs and a second input demultiplexer, wherein the selection circuit is further configured to generate a second selection signal indicating a second target ADC from among the (n+1)-th to 2n-th ADCs, the second selection signal having the k-bit size, and wherein the second input demultiplexer is configured to generate (n+1)-th to 2n-th enable signals each having the 1-bit size based on the second selection signal, and output the (n+1)-th to 2n-th enable signals to the (n+1)-th to 2n-th ADCs, respectively.

8. The image sensor of claim 7, wherein the output multiplexer is a first output multiplexer, and wherein the image sensor further comprises a second output multiplexer connected to the (n+1)-th to 2n-th ADCs.

9. The image sensor of claim 8, wherein the target enable signal is a first target enable signal, wherein the target digital signal is a first target digital signal, wherein the second target ADC is configured to distribute digital bits of a second target digital signal to some of the (n+1)-th to 2n-th ADCs in response to a second target enable signal corresponding to the second target ADC from among the (n+1)-th to 2n-th enable signals, wherein the (n+1)-th to 2n-th ADCs are respectively configured to output (n+1)-th to 2n-th multiplexing bits each corresponding to one of the distributed digital bits of the second target digital signal or the dummy bit to the second output multiplexer, and wherein the second output multiplexer is further configured to output the second target digital signal based on a logical operation of the (n+1)-th to 2n-th multiplexing bits.

10. The image sensor of claim 1, wherein the input demultiplexer is further configured to output the first to n-th enable signals to the first to n-th ADCs through first to n-th enable lines respectively connected to the first to n-th ADCs, respectively.

11. The image sensor of claim 1, wherein each of the first to n-th ADCs is configured to output one corresponding bit from among the first to n-th multiplexing bits to the output multiplexer through respective single lines connected to the output multiplexer.

12. The image sensor of claim 1, wherein the logical operation is based on an OR operation of at least two bits among the first to n-th multiplexing bits.

13. The image sensor of claim 1, wherein a logical value of the dummy bit is "0".

14. An image sensor comprising:

first to 2n-th analog-to-digital converters (ADCs);

a first selection circuit configured to generate a first selection signal indicating a first target ADC from among first to n-th ADCs from among the first to 2n-th ADCs, the first selection signal having k-bit size;

a second selection circuit configured to generate a second selection signal indicating a second target ADC from among (n+1)-th to 2n-th ADCs from among the first to 2n-th ADCs, the second selection signal having the k-bit size;

a first input demultiplexer configured to generate first to n-th enable signals each having 1-bit size based on the first selection signal and to output the first to n-th enable signals to the first to n-th ADCs, respectively;

a second input demultiplexer configured to generate (n+1)-th to 2n-th enable signals each having the 1-bit size based on the second selection signal and to output the (n+1)-th to 2n-th enable signals to the (n+1)-th to 2n-th ADCs, respectively;

a first output multiplexer connected to the first to n-th ADCs; and a second output multiplexer connected to the (n+1)-th to 2n-th ADCs, wherein the first output multiplexer is configured to output a first target digital signal of a first target ADC from among the first to n-th ADCs based on a logical operation of first to n-th multiplexing bits which are received from the first to n-th ADCs and which respectively correspond to digital bits of the first target digital signal of the first target ADC and dummy bits, wherein the second output multiplexer is configured to output a second target digital signal of a second target ADC from among the (n+1)-th to 2n-th ADCs based on a logical operation of (n+1)-th to 2n-th multiplexing bits which are received from the (n+1)-th to 2n-th ADCs and which respectively correspond to digital bits of the second target digital signal of the second target ADC and the dummy bits, and wherein k is an arbitrary natural number and n is a natural number more than k and less than or equal to $2^k$.

15. The image sensor of claim 14, wherein the first selection circuit is further configured to output first to k-th selection bits of the first selection signal to the first input demultiplexer through "k" first input lines, respectively, and wherein the second selection circuit is further configured to output first to k-th selection bits of the second selection signal to the second input demultiplexer through "k" second input lines, respectively.

16. The image sensor of claim 14, wherein the first input demultiplexer is further configured to generate a first target enable signal corresponding to the first target ADC from among the first to n-th enable signals as having a logical value of "1" and generate remaining enable signals from among the first to n-th enable signals as having a logical value of "0", based on the first selection signal, and wherein the second input demultiplexer is further configured to generate a second target enable signal corresponding to the second target ADC from among the (n+1)-th to 2n-th enable signals as having the logical value of "1" and generate remaining enable signals from among the (n+1)-th to 2n-th enable signals as having the logical value of "0", based on the second selection signal.

17. The image sensor of claim 14, wherein the first target digital signal includes first to m-th digital bits, wherein the second target digital signal includes (m+1)-th to 2m-th digital bits, wherein the first to 2n-th ADCs are classified into groups that do not overlap each other, wherein each of the groups includes "m" ADCs, wherein the first target ADC distributes the first to m-th digital bits to the first target ADC and (m−1) ADCs from among the first to n-th ADCs connected to the first target ADC, respectively, in response to a first target enable signal corresponding to the first target ADC from among the first to n-th enable signals, wherein the second target ADC distributes the (m+1)-th to 2m-th digital bits to the second target ADC and (m−1) ADCs from among the (n+1)-th to 2n-th ADCs connected to the second target ADC, respectively, in response to a second target enable signal corresponding to the second target ADC from among the (n+1)-th to 2n-th enable signals, and wherein m is a divisor of n.

18. The image sensor of claim 17, wherein each of remaining ADCs from among the first to 2n-th ADCs other than the first target ADC, the (m−1) ADCs from among the first to n-th ADCs connected to the first target ADC, the second target ADC, and the (m−1) ADCs from among the (n+1)-th to 2n-th ADCs connected to the second target ADC outputs respective ones of the dummy bits having the 1-bit size to the first output multiplexer or the second output multiplexer.

19. An operation method of an image sensor that includes a selection circuit, first to n-th ADCs, an input demultiplexer, and an output multiplexer, the operation method comprising:

generating, by the selection circuit, a selection signal indicating a target ADC from among the first to n-th ADCs, the selection signal having k-bit size;

generating, by the input demultiplexer, first to n-th enable signals each having 1-bit size, based on the selection signal;

outputting, by the input demultiplexer, the first to n-th enable signals to the first to n-th ADCs, respectively;

distributing, by the target ADC, digital bits of a target digital signal to some of the first to n-th ADCs in response to a corresponding target enable signal from among the first to n-th enable signals;

outputting, by the first to n-th ADCs, first to n-th multiplexing bits each corresponding to one of the digital bits or a dummy bit to the output multiplexer, respectively; and outputting, by the output multiplexer, the target digital signal based on a logical operation of the first to n-th multiplexing bits, wherein k is an arbitrary natural number and n is a natural number more than k and less than or equal to $2^k$.

20. The operation method of claim 19, wherein the generating of the first to n-th enable signals each having the 1-bit size based on the selection signal by the input demultiplexer includes generating a target enable signal corresponding to the target ADC from among the first to n-th enable signals as having a logical value of "1"; and generating remaining enable signals among the first to n-th enable signals other than the target enable signal as having a logical value of "0".

* * * * *